United States Patent [19]
DiBiagio et al.

[11] Patent Number: 5,788,306
[45] Date of Patent: Aug. 4, 1998

[54] TRAILER SLIDEOUT MECHANISM

[75] Inventors: Anthony J. DiBiagio. Granger; Marvin P. Burns. Nappanee; Larry Martin. Goshen. all of Ind.

[73] Assignee: Monaco Coach Corporation. Wakarusa, Ind.

[21] Appl. No.: 770,205

[22] Filed: Dec. 19, 1996

Related U.S. Application Data

[62] Division of Ser. No. 311,945, Sep. 26, 1994, Pat. No. 5,620,224.

[51] Int. Cl.$^6$ ........................................ B60P 3/05
[52] U.S. Cl. .................. 296/26.02; 74/110; 74/89.17; 296/165; 296/171; 296/26.13; 384/40
[58] Field of Search ...................... 296/26, 171, 172, 296/173, 175, 176, 165; 52/67; 74/110, 89, 17; 384/40, 58

[56] References Cited

U.S. PATENT DOCUMENTS

| | | |
|---|---|---|
| 2,813,747 | 11/1957 | Rice, Jr. |
| 2,842,972 | 7/1958 | Houdart. |
| 3,106,750 | 10/1963 | Jarman. |
| 3,137,041 | 6/1964 | Mullen. |
| 3,181,910 | 5/1965 | Thomas. |
| 4,277,919 | 7/1981 | Artweger. |
| 4,930,837 | 6/1990 | Marsh. |
| 5,238,290 | 8/1993 | Farmont. |
| 5,491,933 | 2/1996 | Miller et al. ........................ 296/26 X |
| 5,620,224 | 4/1997 | DiBiagio et al. ..................... 296/26 |

FOREIGN PATENT DOCUMENTS 1570553   6/1969   France ........................... 296/26

*Primary Examiner*—Joseph D. Pape
*Attorney, Agent, or Firm*—Leydig, Voit & Mayer, Ltd.

[57] ABSTRACT

A trailer having a slideout mechanism for moving an extensible cabin between a retracted position wherein the cabin is substantially inside the trailer and an extended position wherein the cabin is substantially outside the trailer. The slideout mechanism comprising an extension assembly for positioning the cabin between the retracted and extended positions and a leveling assembly for vertically positioning the cabin floor between a raised position wherein the cabin floor is substantially above the trailer floor and a lowered position wherein the cabin floor is substantially level with the trailer floor. In one embodiment, the leveling assembly comprises a frame member having a predetermined profile for controlling the vertical movement of the outboard end of the cabin floor as the cabin is positioned between the retracted and extended positions. In other embodiments, the leveling assembly comprises a cam assembly or a riser assembly for controlling the vertical position of the cabin floor.

18 Claims, 19 Drawing Sheets

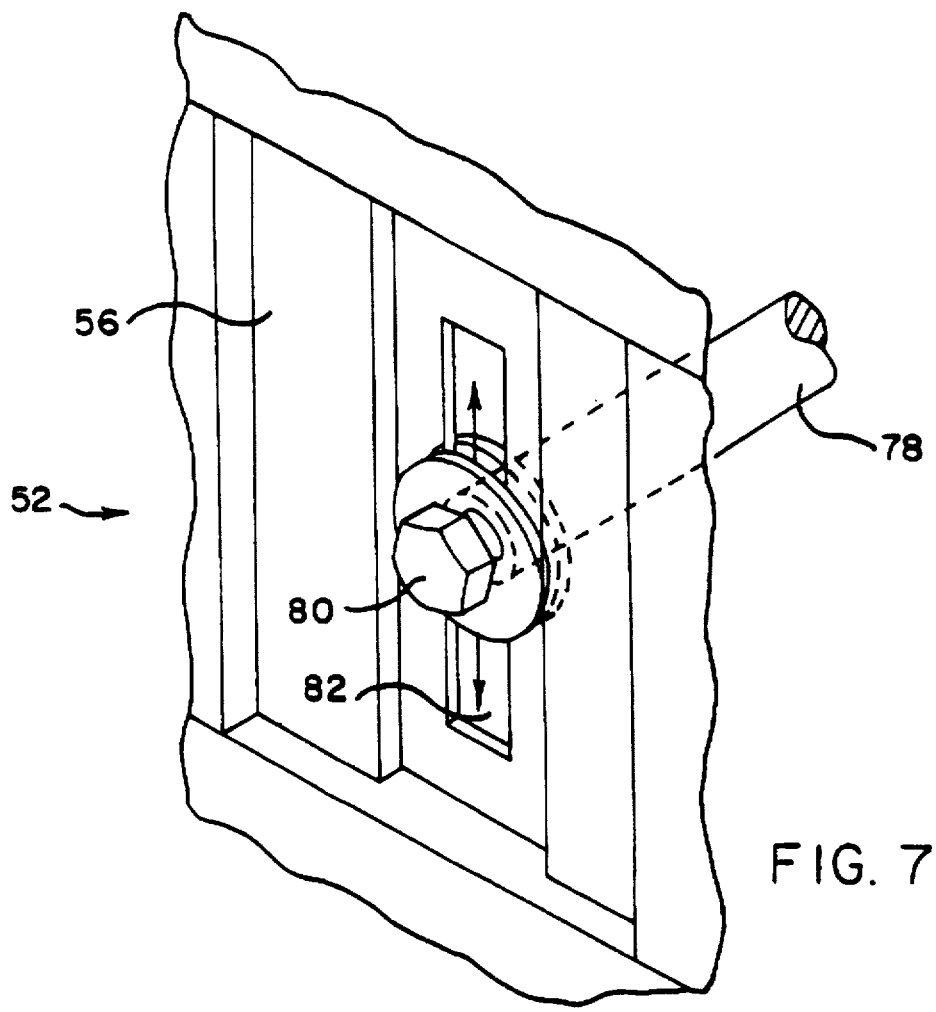
FIG. 7
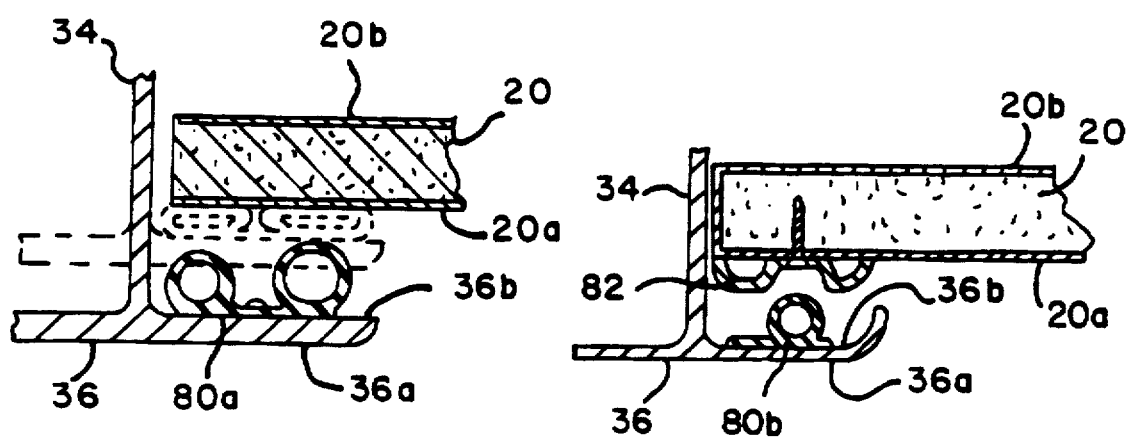
FIG. 8
FIG. 9

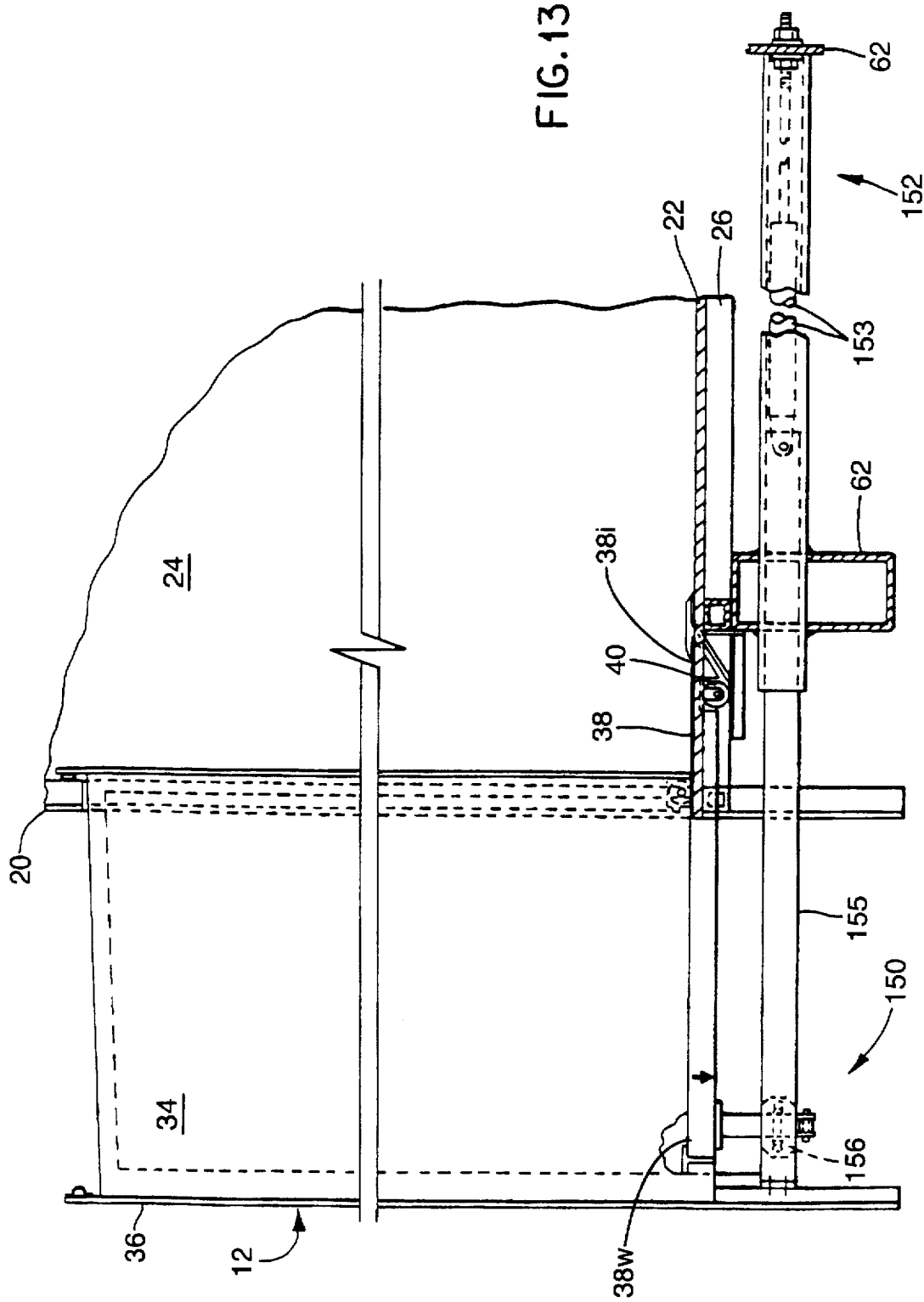

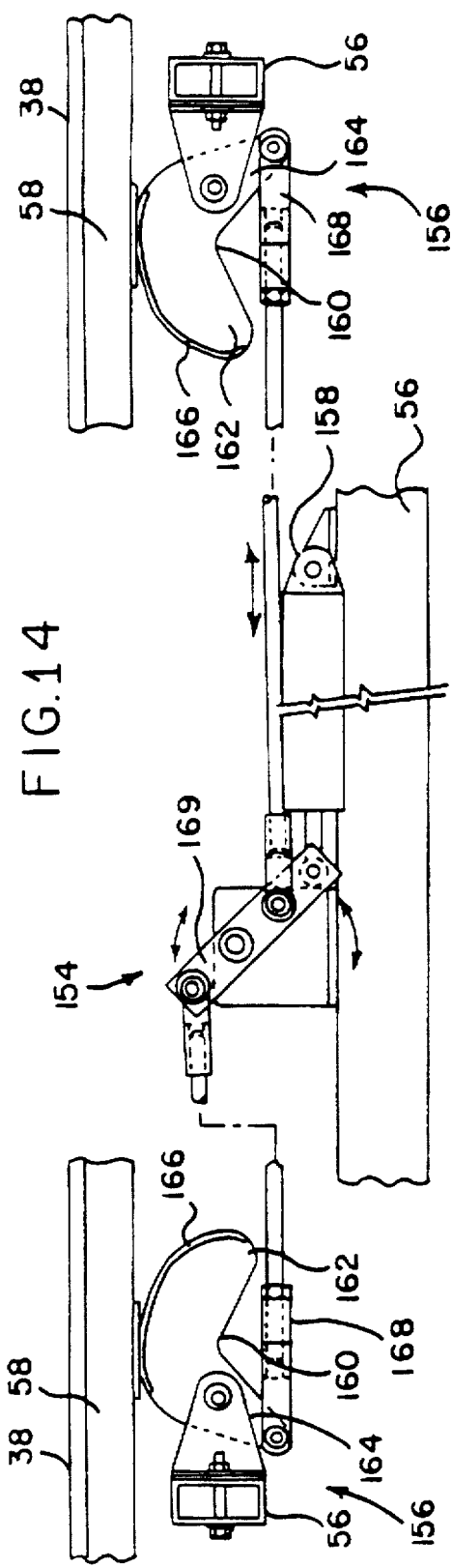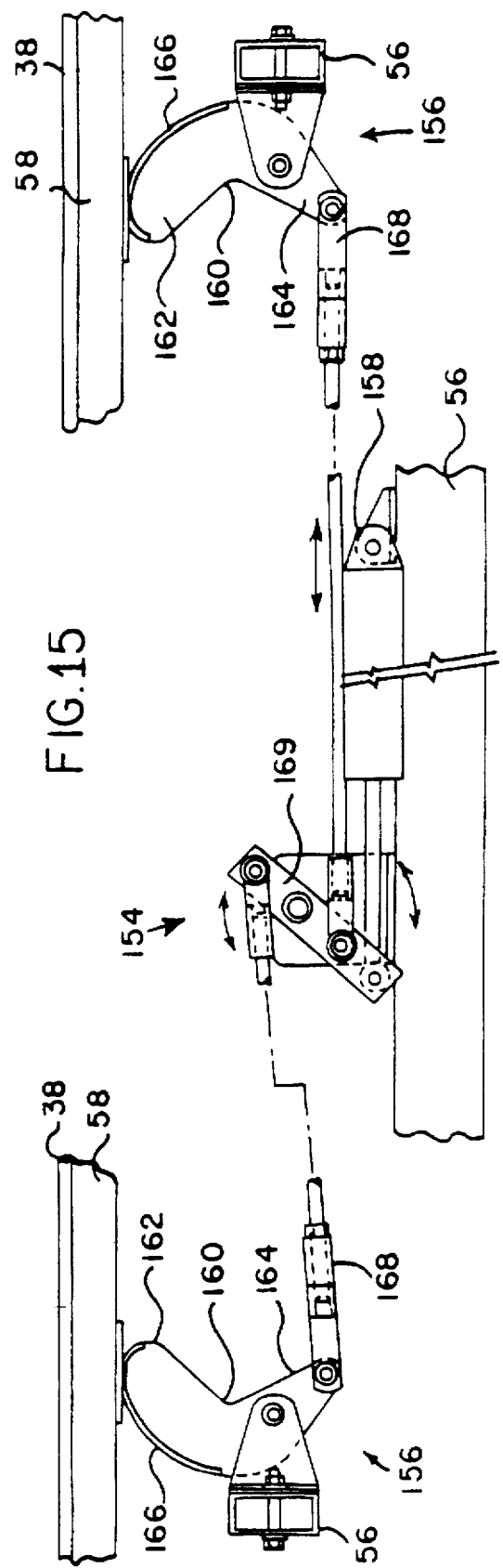

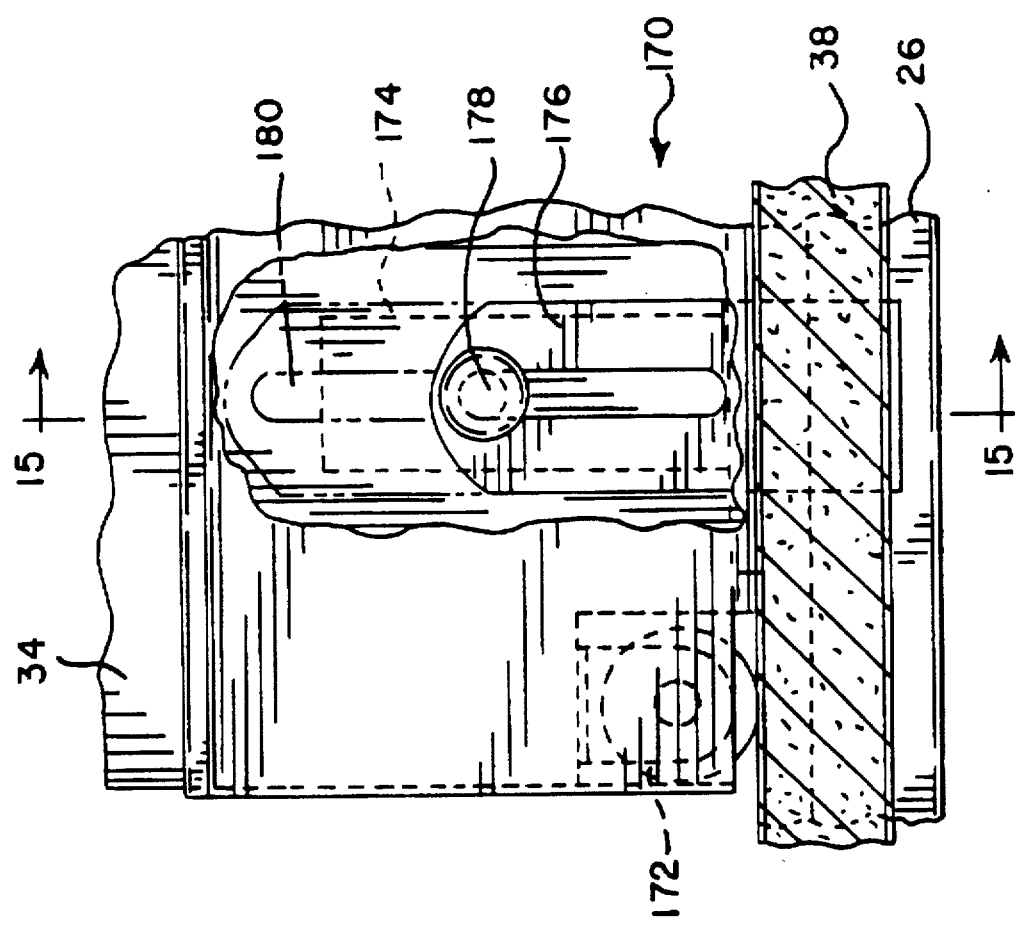
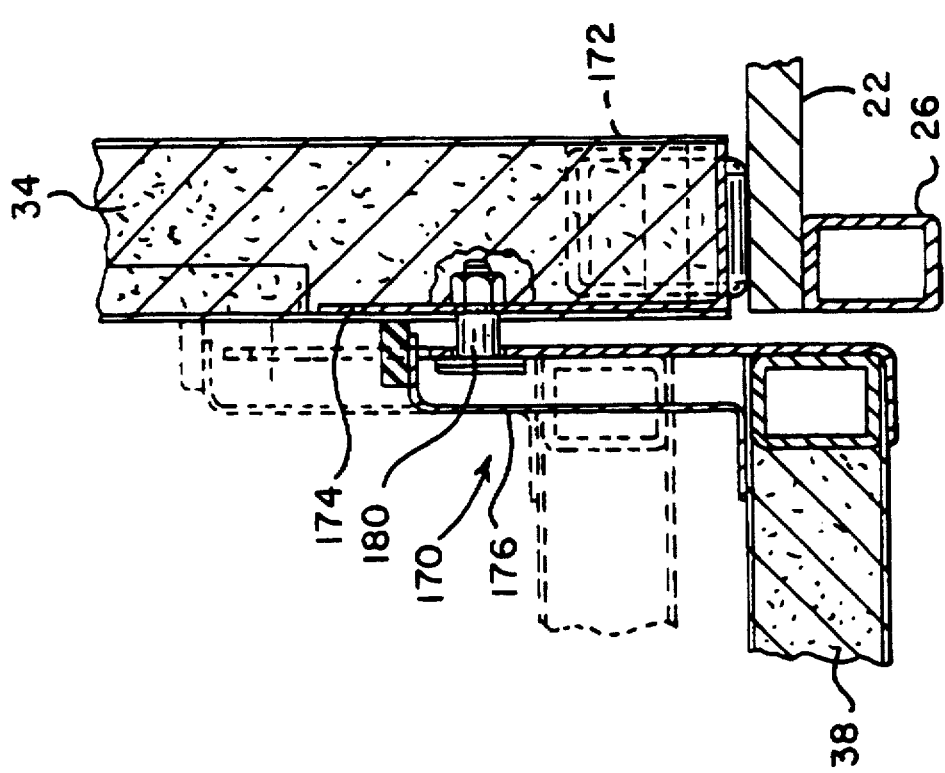

TRAILER SLIDEOUT MECHANISM

This is a divisional application Ser. No. 08/311,945, filed on Sep. 26, 1994, now U.S. Pat. No. 5,620,224.

FIELD OF THE INVENTION

This invention generally relates to travel trailers, fifth wheel trailers, motor homes, recreation vehicles and the like and, more particularly, to such trailers provided with extensible room portions for increasing the living space in the trailer.

BACKGROUND OF THE INVENTION

Many travel trailers have a central or main room containing an extensible cabin portion which is laterally extendable in order to increase the interior space of the trailer when the trailer is parked at its final destination. The extensible cabin portion is typically slidably supported upon the floor of the main room for movement between a stored, retracted position and an extended position.

Typically, the level of the cabin floor is raised slightly above the trailer floor of the main room, forming a raised step which may be several inches high. Unfortunately, in many trailers, the cabin floor remains in the raised position when the cabin is positioned in the extended position. Attempts to provide an extensible cabin room in which the floor is level or flush with the trailer have been unsuccessful.

OBJECTS AND SUMMARY OF THE INVENTION

It is an object of the invention to provide a vehicle such as a mobile home, house trailer, recreation vehicle or the like having a laterally extensible cabin which increases the interior space of the vehicle, while maintaining the traveling size of the vehicle.

It is an object of the invention to provide a trailer having an extensible cabin which can be positioned between a retracted position wherein the cabin is substantially inside the trailer and an extended position wherein the cabin is substantially outside the trailer.

Another object of the present invention is to provide an extensible cabin having a cabin floor which is level with the trailer floor when the cabin is in its extended position.

A further object of the present invention is to provide a cabin which can be extended and retracted while maintaining the cabin floor in a horizontal and level orientation.

A more specific object of the present invention is to provide a mechanism for vertically positioning the outboard end of the cabin floor in unison with the inboard end of the cabin floor to maintain the cabin floor in a horizontal and level orientation.

It is another object of the invention to provide a trailer having an extensible cabin which is easily and quickly assembled and disassembled.

Yet a further object of the invention to provide a trailer having an extensible cabin which may be used when the cabin is in the retracted position.

It is an object of the invention to provide a vehicle having an extensible cabin which is completely sealed about the periphery.

These and other features and advantages of the invention will be more readily apparent upon reading the following description of a preferred exemplified embodiment of the invention and upon reference to the accompanying drawings wherein:

BRIEF DESCRIPTION OF THE DRAWINGS

FIG. 7 is a perspective view of the extension assembly taken along line 7—7 in FIG. 6;

FIG. 8 is a sectional view taken along line 8—8 in FIG. 1, showing one embodiment of a seal assembly for sealing the gap between the cabin wall and the trailer wall;

FIG. 9 is a view similar to FIG. 8 showing another embodiment of the seal assembly for sealing the gap between the cabin wall and the trailer wall;

FIG. 13 is a sectional view of the second embodiment of the slideout mechanism showing the extensible cabin, and the slideout mechanism in an extended position;

FIG. 14 is a sectional view of a floor leveler assembly taken along line 14—14 in FIG. 12 showing the cabin floor and the cam assembly in the lowered position;

FIG. 15 is a sectional view of the floor leveler assembly similar to FIG. 14, showing the cabin floor and the cam assembly in the raised position;

FIG. 16 is a sectional view taken along line 16—16 in FIG. 12 showing the attachment between the cabin floor and the walls;

FIG. 17 is a sectional view taken along line 17—17 in FIG. 16 showing the attachment between the cabin floor and the walls;

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
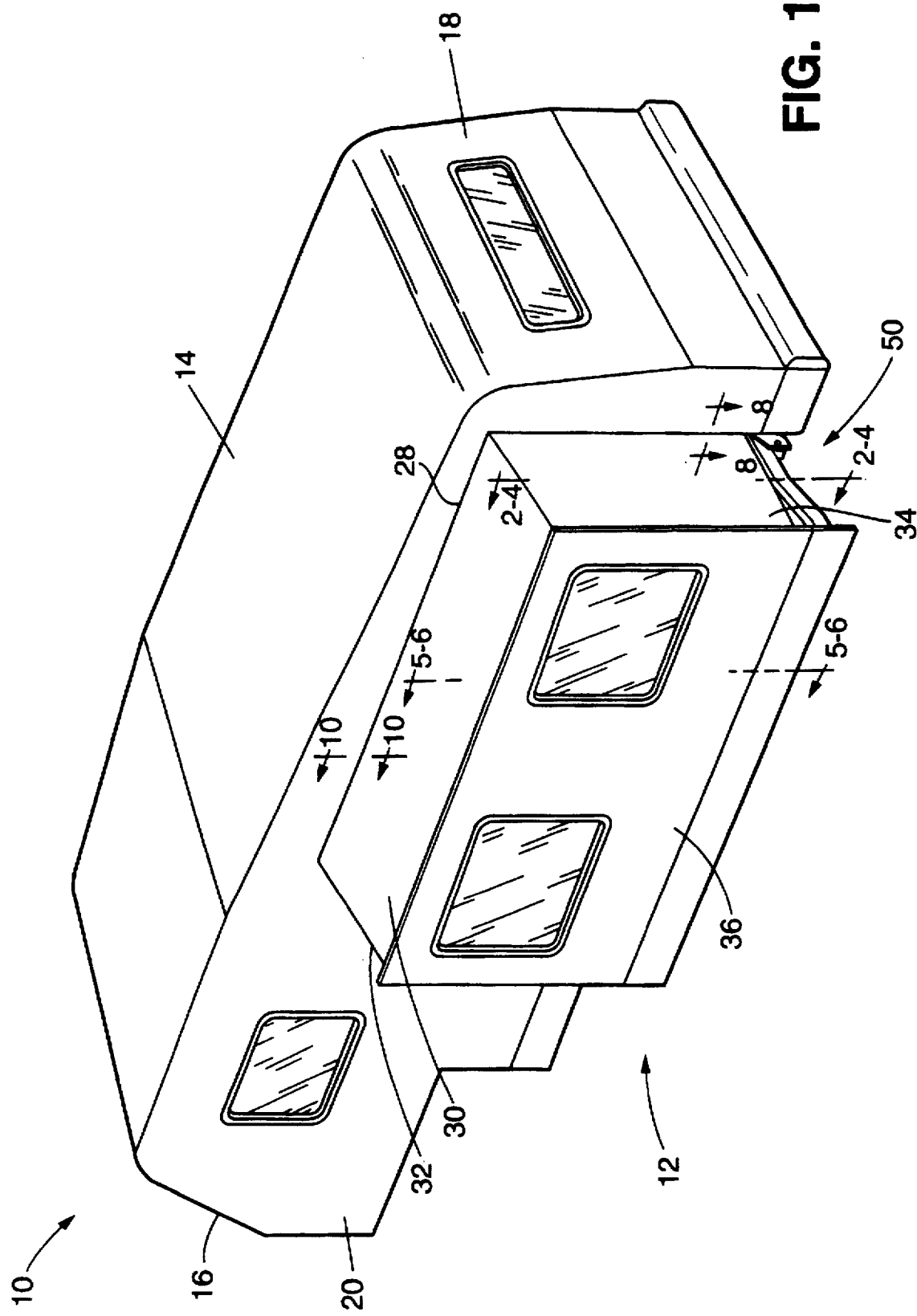
FIG. 1 is a perspective view of a fifth wheel trailer with an extensible cabin in the extended position and one embodiment of a slideout mechanism in accordance with the invention.

Referring to the drawings and particularly to FIG. 1, the illustrated trailer 10 has an extensible cabin or room 12 and a slideout mechanism for moving the cabin between a retracted or stored position and an extended position in accordance with the invention. Although the illustrated trailer 10 is of the "fifth wheel" type which is adapted to be towed by a vehicle (not shown) disposed at the front end, it will be appreciated that the invention is applicable to any type of vehicle or trailer.

The trailer 10 generally has a ceiling 14, a front wall 16, a rear wall 18, two opposing side walls 20 (only the left wall is shown), and a floor 22 which generally define an interior living space 24. The trailer floor 22 is supported on a subfloor frame which is generally referenced as 26 and a trailer frame generally referenced as 62 in FIG. 2. In the illustrated embodiment, the left side wall 20 has an opening 28 for receiving the extensible cabin 12.

Figure 2:
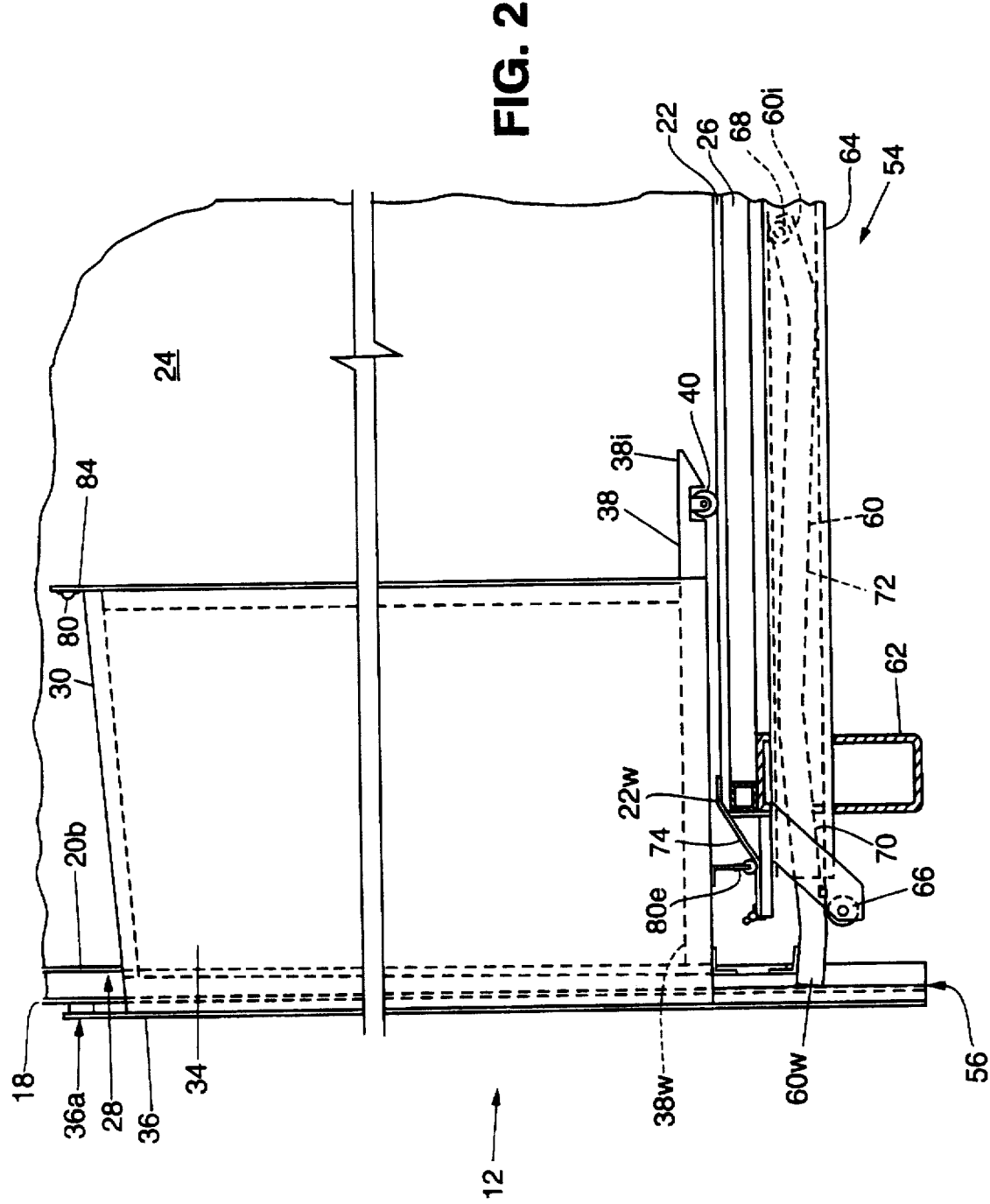
FIG. 2 is a partial sectional view taken along line 2—2 in FIG. 1 showing the extensible cabin and the slideout mechanism in the retracted position.

The extensible cabin 12 is movable between an extended position generally shown in FIG. 1 and a retracted or stored position generally shown in FIG. 2. In the extended position, the cabin 12 is extended outwardly from the interior trailer space 24 which increases the overall space available inside the trailer 10. In the retracted position, the cabin 12 is positioned inwardly into the interior space 24 of the trailer 10 which decreases the exterior dimensions of the trailer 10 for towing and transport over the highways.

As best shown in FIGS. 1-2, the extensible cabin 12 has a cabin ceiling 30, a front wall 32, a rear wall 34, side wall 36, and a floor 38. For ease of reference, the cabin floor 38 has a wall or outboard end referenced as 38w and an interior or inboard end referenced as 38i. The cabin floor 38 will typically have at least one roller 40 disposed at the interior end 38i for slidably engaging and supporting the cabin floor 38 above the trailer floor 22 in the retracted position. As shown in FIG. 2, when the cabin 12 is in the stored position, the cabin floor 38 and the trailer floor 22 are generally parallel to each other and the level of the cabin floor 38 is raised above the level of the trailer floor 22.

In accordance with certain objects of the invention, the trailer 10 has a slideout mechanism for positioning the cabin 12 to an extended position wherein the cabin and the trailer floors 38, 22 are flush with each other. The slideout mechanism comprises (i) means for positioning the cabin 12 between the retracted position (generally shown in FIG. 2) and the extended position (generally shown in FIG. 4) and (ii) means for vertically positioning the cabin floor 22 between a raised position wherein the cabin floor 38 is positioned above the trailer floor 22 in the retracted position and a lowered position wherein the cabin floor 38 is substantially level with the trailer floor 22 in the extended position.

The trailer frame 62 supports the trailer 10 and the slideout mechanism 50. The cabin walls 32, 34, 36 are supported by a rigid vertical frame, generally referenced as 56, which is capable of supporting the cabin walls 32, 34, 36 as the cabin 12 is positioned between the retracted and extended positions. The frame 56 also extends below the cabin floor 38 for engagement with the slideout mechanism 50 as will be described below. The cabin floor 38 has a rigid frame or subfloor, best shown as 58 in FIGS. 14-15, for supporting the cabin floor 38 during movement between the retracted and extended positions and between the raised and lowered positions.

THE FIRST EMBODIMENT

FIGS. 1-11 describe a first embodiment of the slideout mechanism 50 for positioning the extensible cabin 12 between the retracted and extended positions. In the illustrated embodiment, the means for vertically positioning the cabin floor 22 so that the cabin floor 38 is substantially level with the trailer floor 22 comprises a floor leveler assembly 54. The floor leveler assembly 54 also acts to support the cabin 12 in the extended position.

The floor leveler assembly 54 comprises a channel 64 which is rigidly attached to the trailer frame 62 and which is adapted to slidably and telescopingly receive a frame member 60 for movement between a retracted and extended position in unison with the cabin 12. The rollers 40 disposed on the trailer floor 22 support the interior end 38i of the cabin floor 38i. The wall end 60w of the frame 60 is rigidly attached to the wall frame 56, permitting the channel 64 and the frame member 60 to cooperate to support the wall end 38w of the cabin 12 in the extended position. A roller 66, rigidly attached to the trailer frame 62, is disposed between the wall end 60w and the interior end 60i of the frame 60 for slidably supporting the frame 60. The frame interior end 60i has a roller 68 for slidably engaging the top wall of the channel 64. Although only one frame 60 is illustrated, the leveler assembly 54 preferably has a frame 60 disposed at the front and rear ends of the cabin section 12.

In order to raise and lower the wall end 38w and the interior end 38i of the cabin floor 38 relative to the trailer floor 22, the frame member 60 has a predetermined profile adapted to control the vertical movement of the cabin floor 38 relative to the trailer floor 22 as the frame 60 moves between the retracted and extended positions. The frame 60 has an inclined section designated as 70 and a straight section designated as 72 which provides the predetermined vertical movement of the cabin floor 38.

Figure 3:
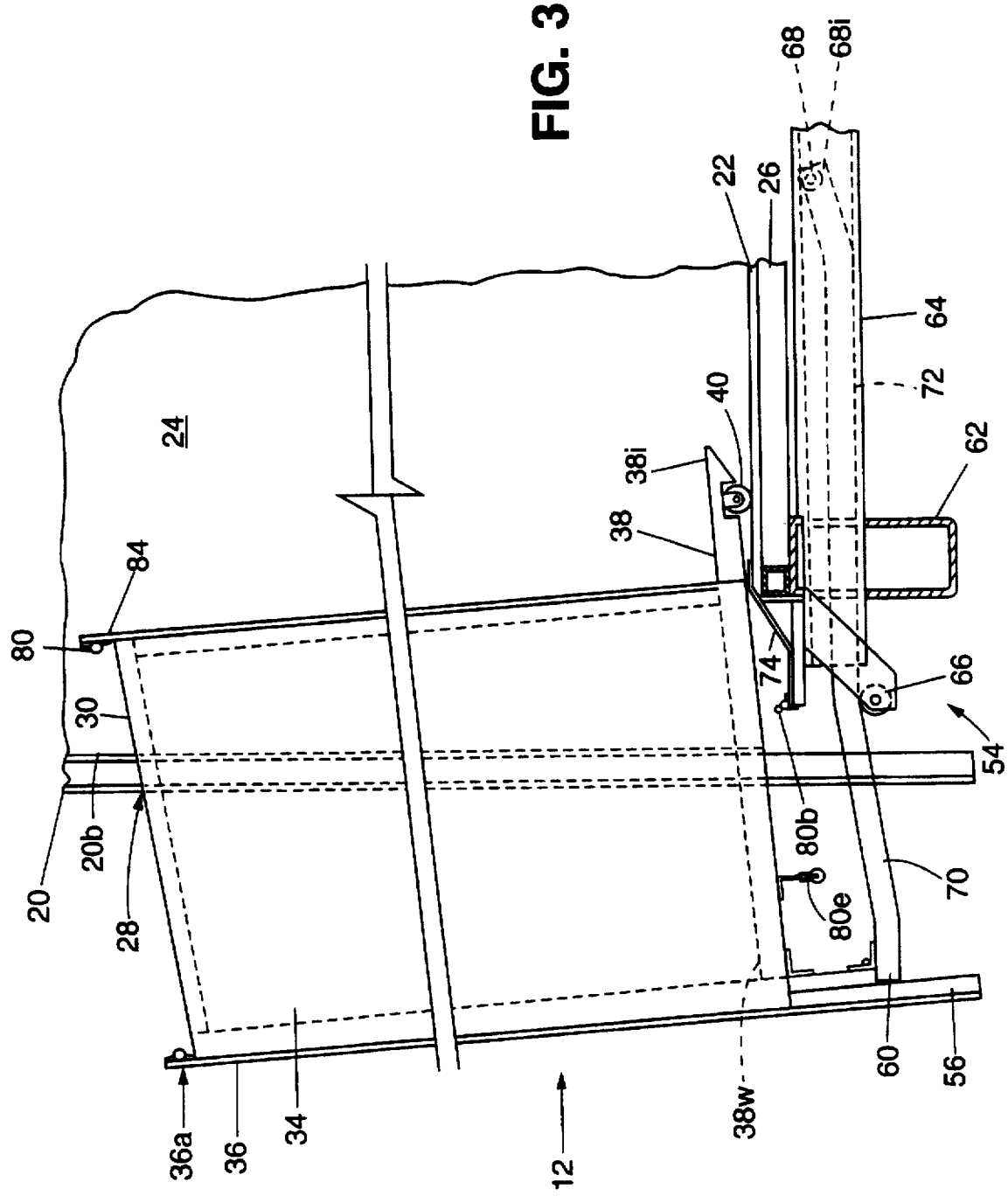
FIG. 3 is a partial sectional view taken along line 3—3 in FIG. 1 showing the extensible cabin and the slideout mechanism in a position intermediate the retracted and extended positions.

The inclined section 70 permits the wall end 38w of the cabin floor 38 to be lowered from its initial level above the trailer floor 22 (as shown in FIG. 2) to a lower level which is level with the trailer floor 22 (as shown in FIG. 3). In the retracted position as shown in FIG. 2, the outboard end of the inclined section 70 rests upon the trailer roller 66 so that the cabin floor 38 is above and generally parallel to the trailer floor 22. As the cabin 12 is positioned toward the extended position, the inclined section 70 travels downwardly relative to the trailer roller 66 causing the cabin walls 32, 34, 36 and the outboard end 38w of the floor to be similarly lowered. It will be seen in FIG. 3 that the difference in level between the interior end 38i and wall end 38w of the cabin floor 38 causes the cabin floor 38 to be slightly inclined. When the upper and inboard end of the inclined section 70 engages the trailer roller 66 as shown in FIG. 3, it will be appreciated that the wall end 38w of the floor 38 is at the same level as the trailer floor 22.

Figure 4:
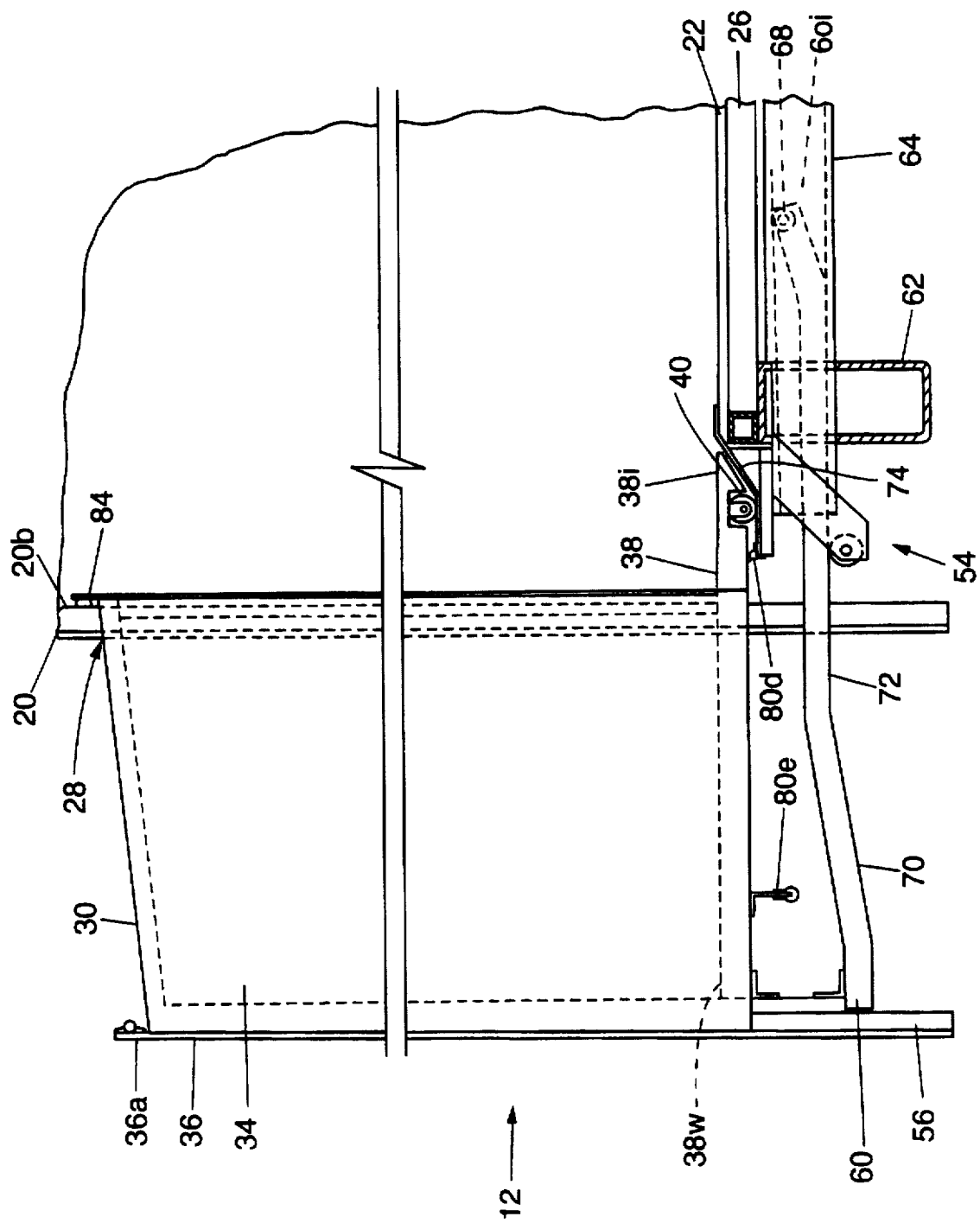
FIG. 4 is a partial sectional view taken along line 4—4 in FIG. 1 showing the extensible cabin and the slideout mechanism in an extended position.
Figure 5:
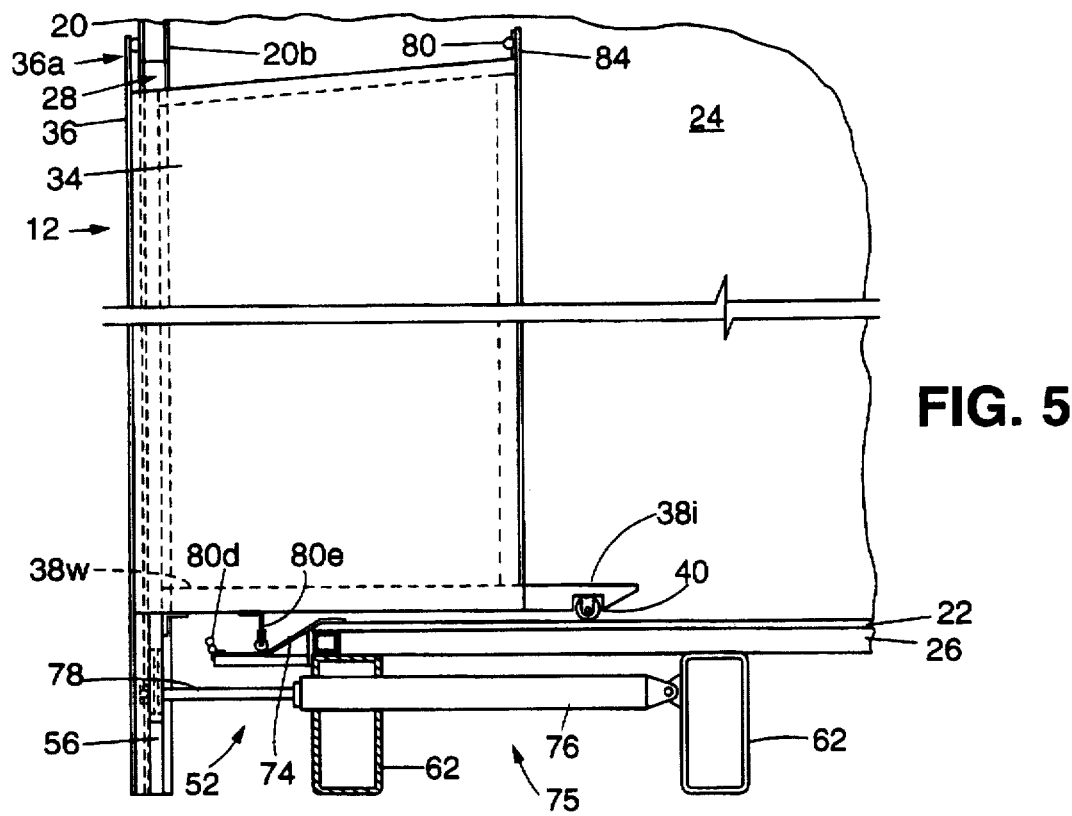
FIG. 5 is a partial sectional view taken along line 5—5 in FIG. 1 showing a first embodiment of an extension assembly in the retracted position.
Figure 6:
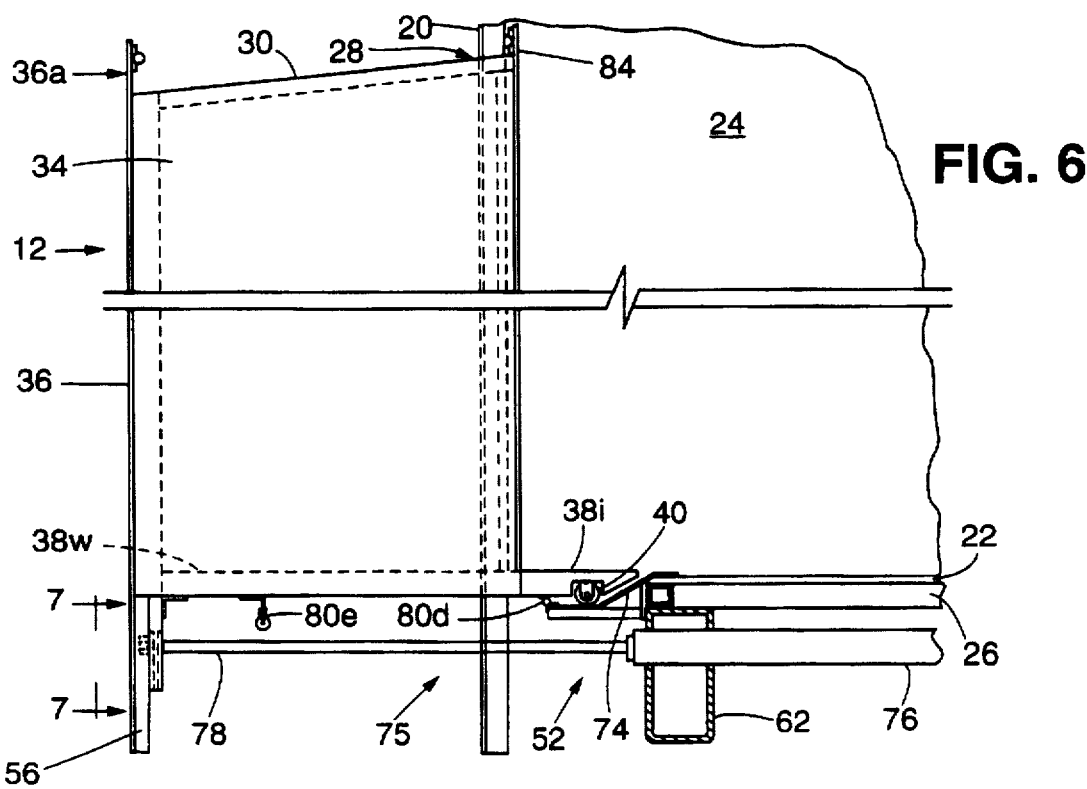
FIG. 6 is a partial sectional view taken along line 6—6 in FIG. 1 showing the extension assembly in the extended position.

Referring to FIG. 3, it will be seen that the continued extension of the cabin section 12 causes the straight portion 72 of the frame 60 to engage the roller 66. The extension of the cabin 12 and the frame 60 causes the cabin rollers 40 to engage a ramp member 74 disposed at the wall end 22w of the trailer floor 22, lowering the interior end 38i of the cabin floor 38 to the same level as the trailer floor 22 as shown in FIG. 4.

Conversely, as the cabin section 12 is positioned toward the retracted position, the cabin rollers 40 roll up the trailer ramp member 74, thereby raising the interior end 38i of the cabin floor 38 above the trailer floor 22. Similarly, engagement between the inclined section 70 of the frame 60 and the roller 66 raises the wall end 38w of the cabin floor 38 in response to the relative position of the inclined section 70 and the roller 66.

The means for positioning the cabin 12 between the retracted position (FIG. 5) and the extended position (FIG. 6) comprises an extension assembly 52. The specific embodiment of the extension assembly 52 illustrated in FIGS. 5–7 comprises an actuator 75 centrally disposed between the front and rear ends of the cabin 12. The actuator 75 comprises a hydraulic cylinder 76 rigidly attached to the trailer frame 62 and an extensible piston rod 78 attached to the cabin frame 56. Movement of the piston rod 78 causes the cabin frame 56 and the cabin 12 to move between the retracted and extended positions.

In order to accommodate the vertical movement of the cabin section 12 relative to the trailer frame 62 and hence the actuator 75, the piston rod 78 slidably engages the cabin frame 56. Referring to FIG. 7, a bolt 80 slidably attaches the piston rod 78 to a slot 82 in the cabin frame 56. Thus, the cabin frame 56 may be positioned between the retracted and extended positions in response to the movement of the actuator 75 whereas the vertical movement of the cabin frame 86 caused by the leveler assembly 54 does not affect the horizontal position of the actuator 75. Although a hydraulic actuator is described in the illustrated embodiment, it will be appreciated that other actuation means will be known to those skilled in the art including, but not limited to, an electrically driven cylinder.

The trailer 10 also has means for sealing the gaps defined by the periphery of the cabin section 12 and the opening 28 in the trailer wall 20 in order to prevent infiltration of outside air and engine fumes into the trailer interior 28. In order to seal the gap between the cabin walls 32, 34 and the trailer wall 20 when the cabin section 12 is positioned at the retracted position, the periphery of the cabin side wall 36 has a flange 36a adapted to extend in overlapping relationship with the trailer wall 20 as shown in FIG. 8. The wall flange 36a has an inner side 36b opposing the exterior side of the trailer wall 20a. A resilient seal member 80a attached to the inner side 36b sealably engages the exterior side of the trailer wall 20a to close the gap when the cabin section 12 is in the retracted position. In the embodiment illustrated in the FIG. 8, the seal member 80a comprises a plurality of resilient tubular or bulb members which are adapted to sealably engage the trailer wall 20a in response to engagement with the trailer exterior wall 20a. In the embodiment illustrated in FIG. 9, the seal member 80b comprises one tubular member disposed on the flange inner side 36b which is adapted to cooperatively engage a U-shaped channel 82 on the exterior surface 20a of the trailer wall 20.

Figure 10:
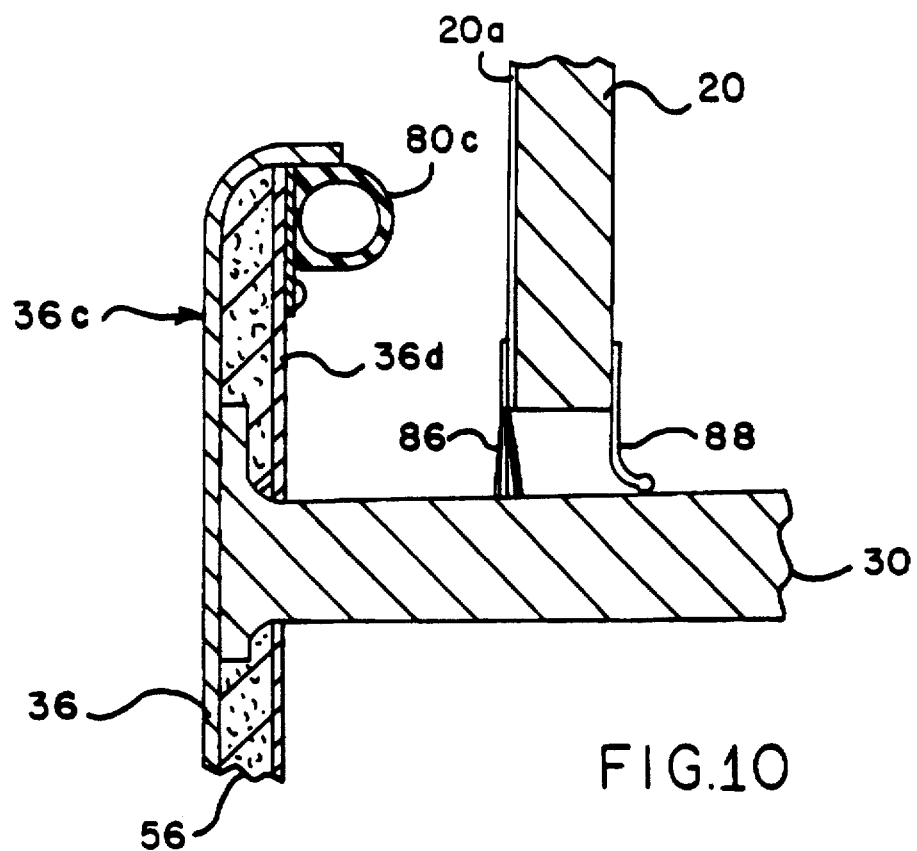
FIG. 10 is a sectional view taken along line 10—10 in FIG. 1, showing one embodiment of the seal assembly for sealing the gap between the cabin ceiling and the trailer walls.
Figure 11:
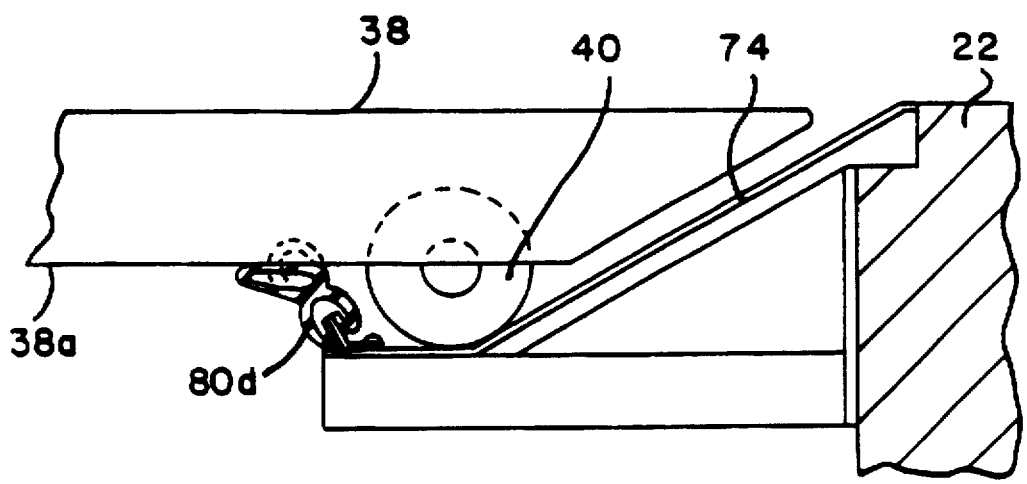
FIG. 11 is another embodiment of the seal assembly for sealing the gap between the cabin floor and the trailer floor.

In order to seal the gap between the cabin ceiling 14 and the trailer wall 20 when the cabin section 12 is in the retracted position, the top periphery of the cabin wall 36 has a flange 36c which is adapted to extend in overlapping relationship with the trailer wall 20. As shown in FIG. 10, the flange 36c has an inner side 36d opposing the exterior side 20a of the trailer wall 20 and a resilient seal member 80c attached to the flange inner side 36d which sealably engages the trailer wall 20a to close the gap when the cabin section 12 is positioned at the retracted position. The trailer wall 20, adjacent the cabin ceiling, also has a brush seal member 86 and a flexible lip seal member 88 to enhance the seal and minimize infiltration of dirt and particulate matter which may collect on the cabin ceiling 30.

In order to seal the gap between the cabin walls 32, 34 and the trailer wall 20 when the cabin section 12 is positioned at the extended position, the periphery of the cabin ceiling 30 and the front and rear walls 32, 34 have a flange 84 partially shown in FIGS. 2–6, which is adapted to extend in overlapping relationship with the interior side 20b of the trailer wall 20. Any of the resilient seal members 80 described above may be attached to the inner side of the flange 84 to sealably engage the trailer wall 20 to close the gap when the cabin section 12 is positioned at the extended position.

In order to seal the gap between the cabin floor 38 and the trailer floor 22 when the cabin 12 is positioned at the extended position, the lower end of the trailer ramp section 74 has at least one seal member 80d disposed for engaging the underside 38a of the cabin floor 38 when the cabin floor 38 is in its lowered position, i.e., when the cabin section 12 is positioned at the extended position. In the illustrated embodiment, the seal member 80d comprises a resilient tubular member although other shapes will be appropriate and will be known to those skilled in the art.

In order to seal the gap between the cabin floor 38 and trailer floor 22 when the cabin 12 is positioned at the retracted position, a seal member 80e is disposed subjacent the cabin floor 38 for sealing engagement with the ramp 74 as best shown in FIG. 2.

The seal members 80 described above and illustrated in FIGS. 8–11 may be made from any resilient flexible material which will be known to those skilled in the art and which is adapted to deform in response to engagement with the trailer wall 20, thereby maximizing the seal surface and enhancing the seal. It will also be appreciated that the different embodiments of the seal members 80a, b, c, d, e described above are interchangeable with each other.

THE SECOND EMBODIMENT

FIGS. 12–17 illustrate a second embodiment of the slide-out mechanism 150. In the second embodiment of the slideout mechanism 150, the means for positioning the cabin section between the retracted position (FIG. 12) and the extended position (FIG. 13) comprises the extension assembly 152 and the means for vertically positioning the floor between the raised and lowered positions comprises the floor leveler assembly 154.

Like the first embodiment, the floor leveler assembly 154 comprises a plurality of rollers 40 which supports the interior end 38i of the cabin floor 38 on the trailer floor 22, and a ramp section 74 disposed at the wall end 22w of the trailer floor 22 controls the elevation of the interior end 38i of the cabin floor 38. In this embodiment, however, the wall frame 56 (and the wall end of the cabin 12) is supported by a substantially straight frame member 155 which slidably engages the channel member 64.

The floor leveler assembly 154 has a cam assembly, generally designated as 156, which controls the elevation of the wall end 38w of the cabin floor 38. The wall end 38w of the cabin floor 38 is supported by at least one cam assembly 156 and preferably two cam assemblies rigidly attached to the and disposed at the front and rear ends of the cabin section 12. Referring to FIGS. 14–15, each cam assembly 156 comprises a cam member 160 operatively connected to an actuator 158 adapted for rotating the cam members 160 between raised and lowered positions. Each cam member 160 has a first end 162 defining a cam surface 166 which slidably engages the underside of the wall end 38w of the cabin floor 38. The second end 164 of the cam member 160 is attached to a pivot actuator 158 by linkages 168 and 169 for pivoting the cam member 160 between a raised position in which the cam member 160 raises the wall end 38w of the cabin floor 38 above and parallel to the trailer floor 22, and a lowered position in which the cam member 160 lowers the wall end 38w of the cabin floor 38 to the same level as the trailer floor 22. In FIGS. 14 and 15, rotation of the linkage 169 in the clockwise direction positions the cam member 160 toward the raised position. Conversely, rotation in the counterclockwise direction positions the cam member 160 toward the lowered position. In the illustrated embodiment, the cam actuator 158 is a hydraulic cylinder, although other actuation means will be known to those skilled in the art, including, but not limited to electric-driven cylinders.

Figure 12:
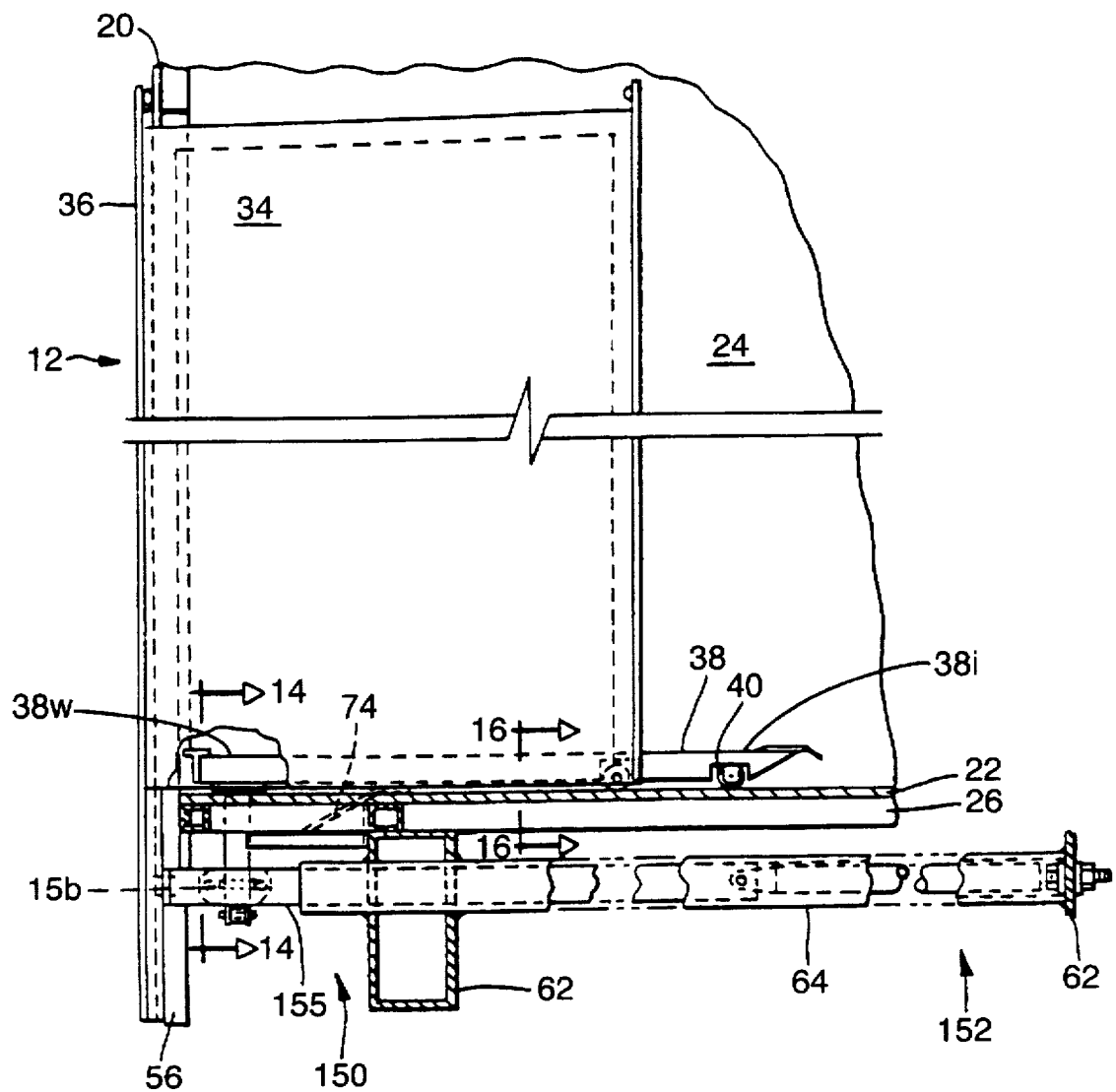
FIG. 12 is a sectional view similar to FIG. 2 but showing the extensible cabin, a second embodiment of the slideout mechanism in the retracted position and a second embodiment of the extension assembly.

When the cabin 12 is in the retracted position as generally shown in FIG. 12, the level of the cabin floor 38 is above and substantially parallel to the trailer floor 22, and the cam member 150 and the wall end 38w of the cabin floor 38 are in the raised position and the cabin rollers 40 rest upon the trailer floor 22. As the extension assembly 152 positions the cabin section 12 toward the extended position, the cabin frame 56 and the cam assembly 156 attached to the cabin frame 56 also extend, maintaining the cabin floor 38 substantially parallel with the trailer floor 22. At an intermediate position in which the cabin rollers 40 initially engage the inclined ramp section 74, it will be appreciated that the cabin floor interior end 38i initially begins to lower, creating an incline in the cabin floor 38.

In accordance with certain objects of the invention, the leveler assembly 154 is adapted to maintain the cabin floor in a horizontal and level orientation. The operation of the cam actuator 158 is synchronized with the position of the cabin rollers 40 relative to the trailer ramp section 74 to maintain the cabin floor 38 in a horizontal and level orientation. The cam member 160 raises and lowers the wall end 38w of the cabin floor 38 in response to the vertical movement of the interior end 38i of the cabin floor 38, thereby maintaining a horizontal and level orientation of the cabin floor 38. Thus, when the interior end 38i of the cabin floor 38 is level with the trailer floor 22 and positioned at the bottom of the trailer ramp 74, the cam member 160 is positioned at its lowered position (FIG. 14).

Conversely, as the extension assembly 152 retracts the cabin section 12 into the trailer and the cabin rollers 40 travel up the ramp section 74, the cam actuator 158 is synchronized to rotate the linkage 169 in the counterclockwise direction, raising the cam member 160 and the wall end 38w of the cabin floor 38 in unison with the interior end 38i of the cabin floor.

In one embodiment, the inboard end of the cabin floor has a limit switch (not- shown) which activates the actuator when the roller engages the top of the ramp, thereby lowering the outboard and inboard ends of the cabin floor in unison. The limit switch deactivates the actuator when the cabin floor reaches the lowered position. Conversely, the limit switch activates the actuator to raise the outboard end of the cabin floor when the rollers travel up the ramp and deactivates the switch when the cabin floor is at the raised position. Other means will be known to those skilled in the art for synchronizing the operation of the actuator to control, in unison, the orientation of the outboard and inboard ends of the cabin floor.

It should now be appreciated that the floor leveler assembly 154 maintains the cabin floor in level orientation throughout the cabin's movement between the retracted and extended positions. In addition, the cabin floor 38 moves in unison with the cabin walls 32, 34, 36 in the horizontal direction and independently of the cabin walls 32, 34, 36 in the vertical direction. That is, the cabin walls 32, 34, 36 remain at the same vertical position while only the cabin floor 38 changes its vertical position in order to eliminate the height differential with the trailer floor 22. In order to adjust the vertical position of the cabin floor 38 independently of the cabin walls 32, 34, 36, a linkage assembly generally designated as 170 in FIGS. 16–17 slidably attaches the cabin floor 38 to the cabin walls 32, 34, 36. FIGS. 16–17 illustrate the linkage assembly 170 associated with the rear cabin wall 34 but each wall will have at least one linkage assembly 170. The cabin wall 34 has a wall roller 172 for permitting the cabin wall 34 to roll on the trailer floor 22 in response to movement of the cabin section 12 by the extension assembly 152. The cabin wall 34 also has a bracket 174 disposed about the inner periphery of the cabin wall 34. The cabin floor 38 has a plurality of brackets 176 corresponding to the wall brackets 174, each floor bracket 176 having a protruding pin 178 adapted for slidably engaging a vertical slot 180 disposed in the wall bracket 174. It should now be appreciated that the linkage assembly 170 maintains a generally perpendicular orientation and spacing between the cabin floor 38 and walls 30, 32, 34 as the cabin floor 38 moves between the raised position (phantom lines) and the lowered position shown in FIG. 17.

The extension assembly 152 in the embodiment illustrated in FIGS. 12–13 comprises an actuator 153 rigidly attached to the trailer frame 62 and the frame 155 for positioning the frame 155 and the cabin 12 between the retracted and extended positions.

Figure 24:
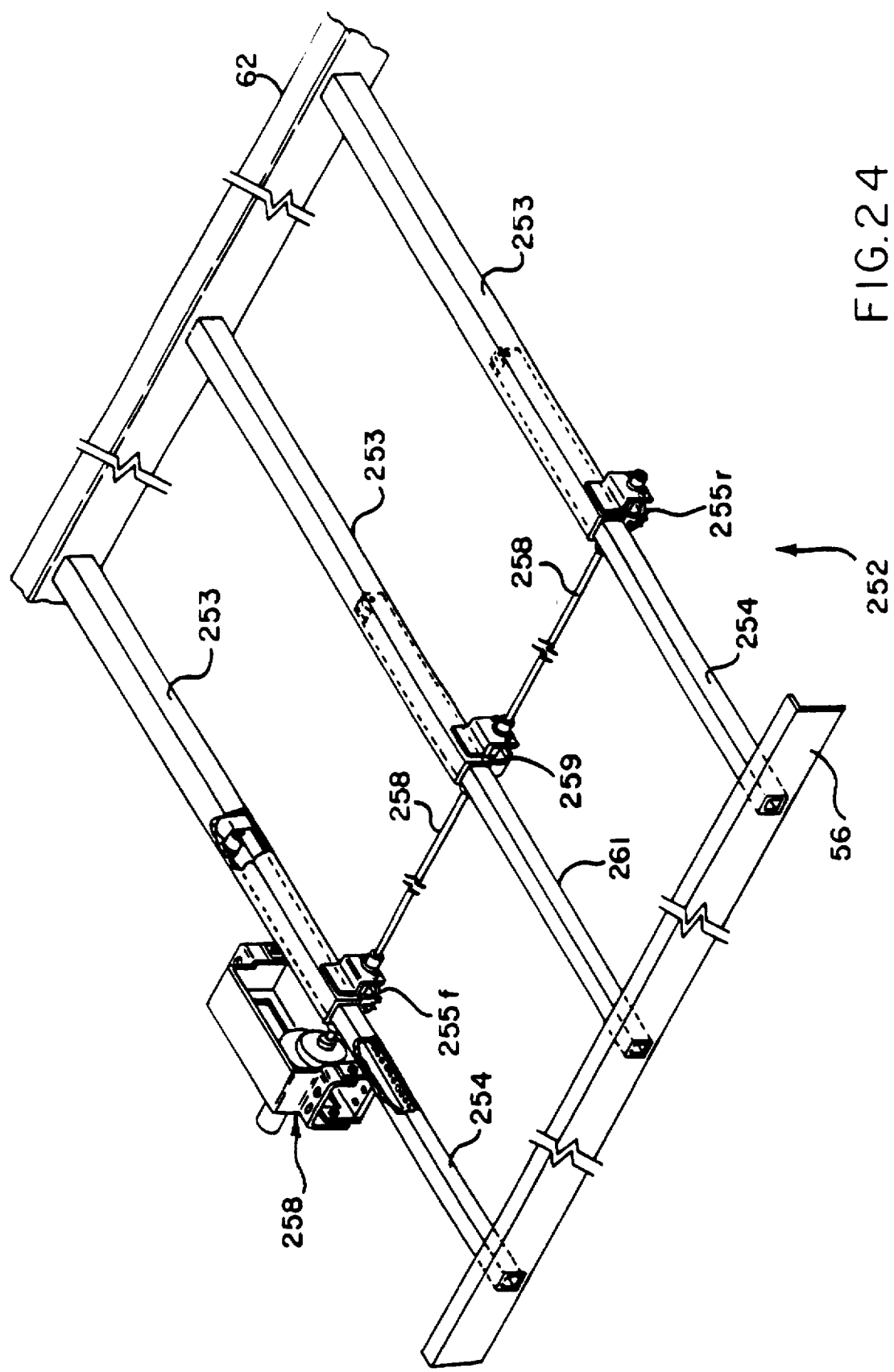
FIG. 24 is a perspective view of the support assembly and a third embodiment of the extension assembly.
Figure 25:
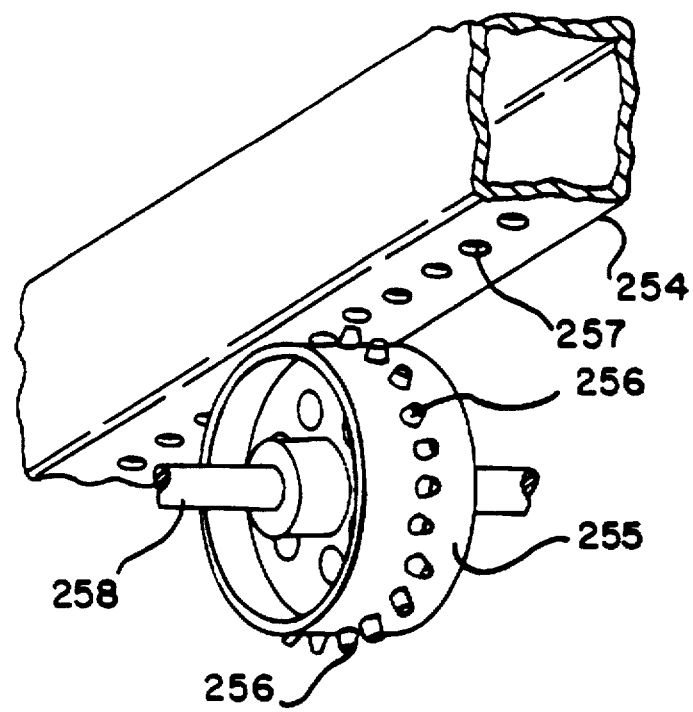
FIG. 25 is a perspective of the drive assembly for controlling the extension of the support assembly.

A third embodiment of the extension assembly 252 is also illustrated in FIGS. 24–25. The extension assembly 252 comprises a plurality of stationary channel members 253 which are rigidly attached to the trailer frame (generally referenced as 62 in FIGS. 24–25) and corresponding frame members 254 which slidably and telescopingly engage the channel members 253. The wall ends 254w of the frame members 254 are rigidly attached to the wall frame (generally referenced as 56), and, thus, support the wall end of the cabin 12 during movement between the retracted and extended positions as described above.

The extension assembly 252 also comprises a roller 255 having a plurality of fingers 256 projecting outwardly from periphery of the roller 255. The fingers 256 are adapted to engage corresponding holes 257 disposed on the frame member 254 such that rotation of the roller 255 creates linear movement of the frame member 254 and the cabin 12 attached thereto. A conventional motor 258 drives the rollers 255. In the illustrated embodiment, the extension assembly 252 comprises front and rear rollers 255f, 255r (and corresponding frame members) disposed near the front and rear of the cabin and rigidly connected by linkage 258 to insure that the cabin 12 is positioned evenly. A third roller 259 and frame member 261 is disposed in the middle of the cabin 12 to provide additional support for the cabin 12.

It will be appreciated that any of the three extension assemblies described may be utilized to position the cabin 12 between the retracted and extended positions.

THE THIRD EMBODIMENT

Figure 18:
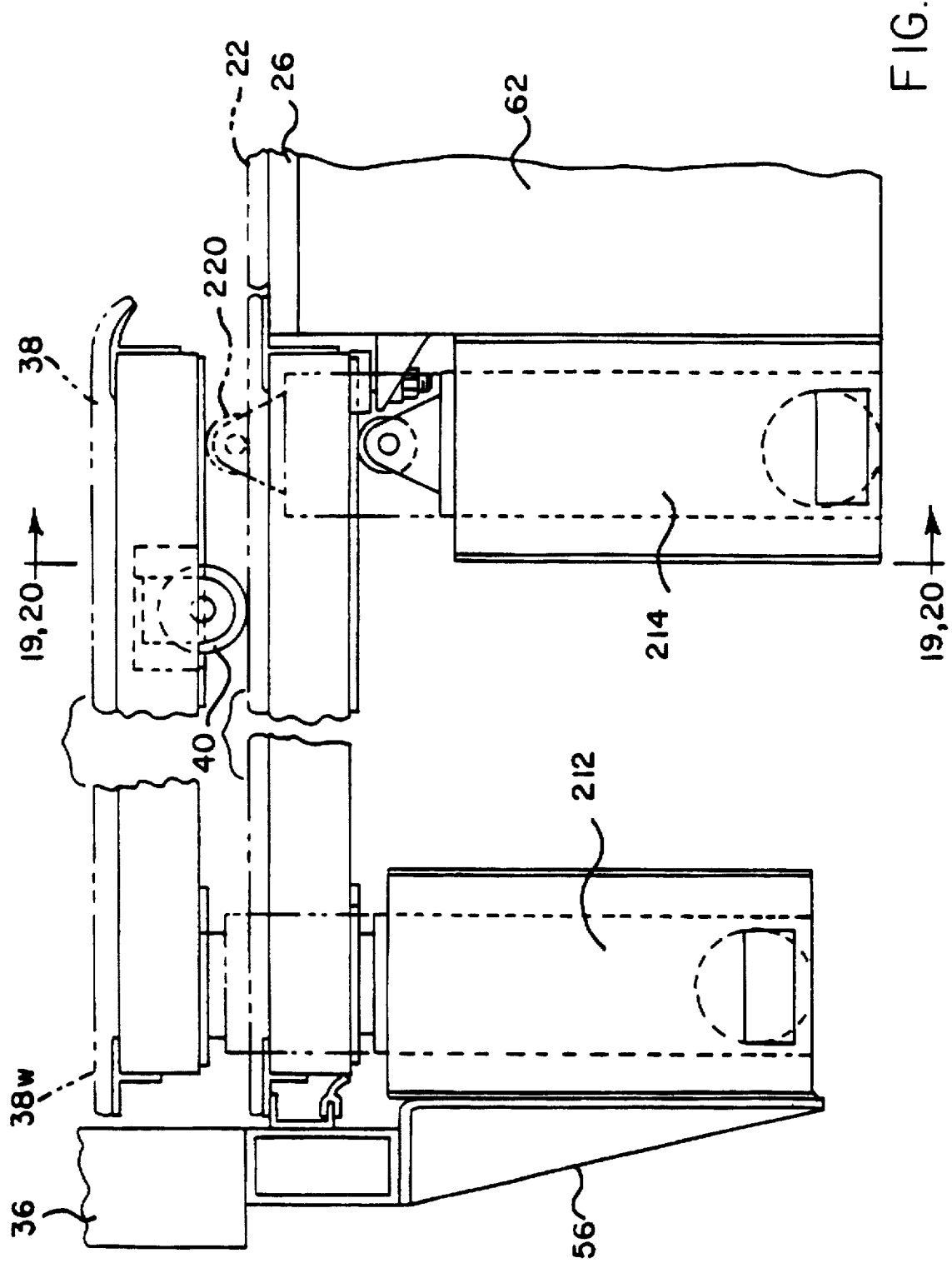
FIG. 18 is a sectional view similar to the view in FIG. 14 showing a third embodiment of the floor leveler assembly having a left and right set of levelers in the lowered position (in solid lines) and in the raised position (in phantom lines)
Figure 19:
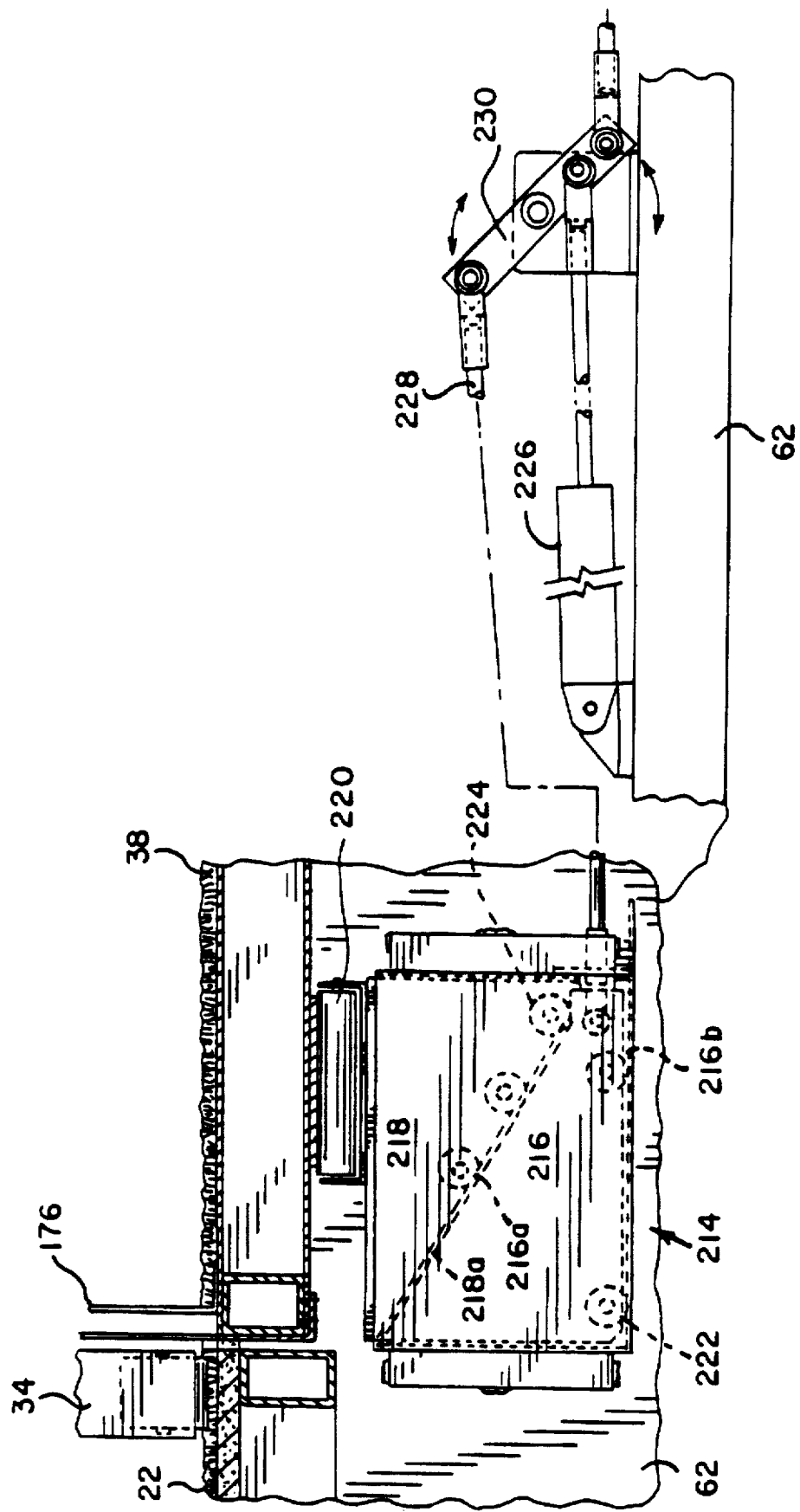
FIG. 19 is a sectional view of the floor leveler assembly taken along line 19—19 in FIG. 18 showing the right leveler in the lowered position.
Figure 20:
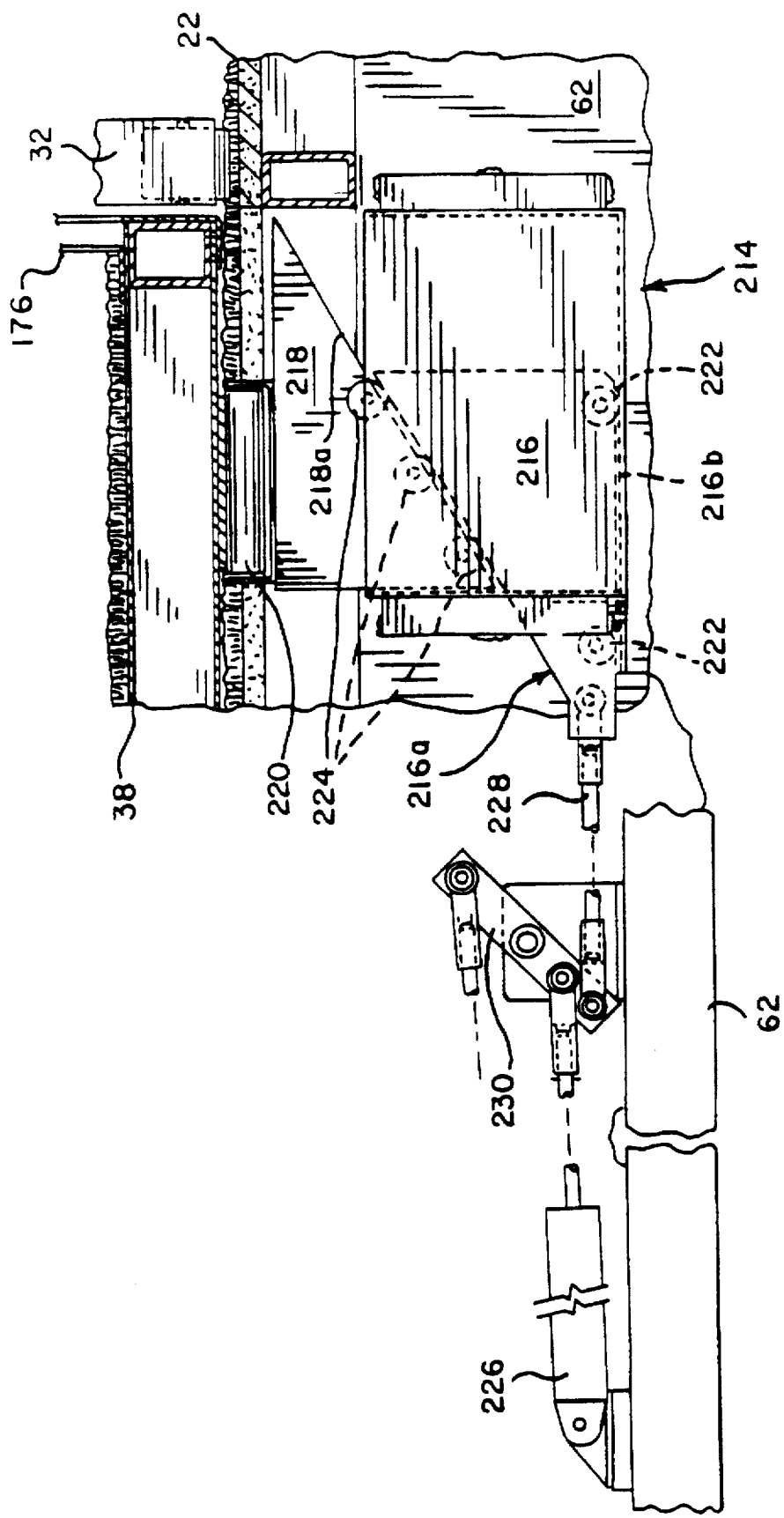
FIG. 20 is a sectional view of the floor leveler assembly taken along line 20—20 in FIG. 18 showing the right leveler in the raised position.

FIGS. 18–20 illustrate a third embodiment of the slideout mechanism 200. The slideout mechanism 200 comprises one of extension assemblies (not shown in FIGS. 18–20) as previously described for positioning the cabin between the retracted and extended positions. The floor leveler assembly 210, comprises at least one riser assembly 212 attached to the wall frame 56 for controlling the vertical orientation and movement of the wall end 38w of the cabin floor 38 and at least one riser assembly 214 attached to the trailer frame 62 for controlling the vertical position and movement of the interior end 38i of the floor 38. The illustrated embodiment comprises two pairs of riser assemblies disposed adjacent the wall end of the cabin floor 38w and the trailer floor 22w, respectively.

The riser assembly 214 for controlling the vertical position of the interior end 38i of the cabin floor 38 (shown in FIG. 19) comprises a bottom and top riser frame 216, 218 having a generally triangular cross section. A horizontal roller 220 is rotatably attached to the top riser frame 218 for supporting the cabin floor 38 and permitting the floor 38 to slide in response to the extension assembly. The bottom riser frame 216, operatively supported by the trailer frame 62, has an inclined face 216a and a plurality of rollers 222 on the bottom side 216b for permitting the riser frame 216 to slide adjacent the trailer frame 62 in the horizontal direction as viewed in FIG. 19. The top triangular riser frame 218 has an inclined face 218a and a plurality of rollers 224 slidably engaging the bottom inclined face 216a. It will be appreciated that movement of the bottom riser 216 in the horizontal direction (as shown in FIGS. 19–20) causes vertical movement of the top riser 218.

The bottom riser frames 216 are attached to an actuator 226 by linkages 228, 230. Rotation of the linkage 230 in the clockwise direction by the actuator 226 causes the bottom riser frames 216 to move inwardly toward the actuator 226, thereby raising the top riser frame 218 and floor roller 220. Thus, the cabin floor 38 is raised in response to the actuator 226. Conversely, rotation of the linkage 230 in the counterclockwise direction causes the bottom riser frames 216 to move outwardly, resulting in downward vertical movement of the top riser frame 218 and floor roller 220. Thus, the cabin floor 38 is lowered in response to the actuator 226.

The riser assemblies 212 for controlling the vertical position of the wall end 38i of the cabin floor 38 operate as described above except that the top riser frame 218 is rigidly attached to the underside of the cabin floor 38. The riser assembly 212 moves between the retracted and extended position in unison with the cabin floor 38 and, therefore, does not require the floor roller 220.

When the cabin floor 38 is positioned at the retracted position, the riser assemblies 212, 214 are in the raised position. As the cabin floor 38 is positioned toward the extended position by the extension assembly 202, the riser assembly 212 attached to the wall end 38w travels in unison cabin floor 38. The horizontal floor roller 220, associated with second riser assembly 214, slidably supports the cabin floor 38. Thus, the cabin floor 38 remains in a substantially level orientation until it reaches the extended and outboard position generally illustrated in phantom in FIG. 18. The actuator 226 rotates the linkages 228, 230 in the clockwise direction which causes the cabin floor 38 to be lowered until the cabin floor 38 is level with the trailer floor 22 as shown in FIG. 18. It will be appreciated that the riser assemblies 212, 214 only lower the cabin floor when the cabin is positioned at the extended position.

THE FOURTH EMBODIMENT

Figure 21:
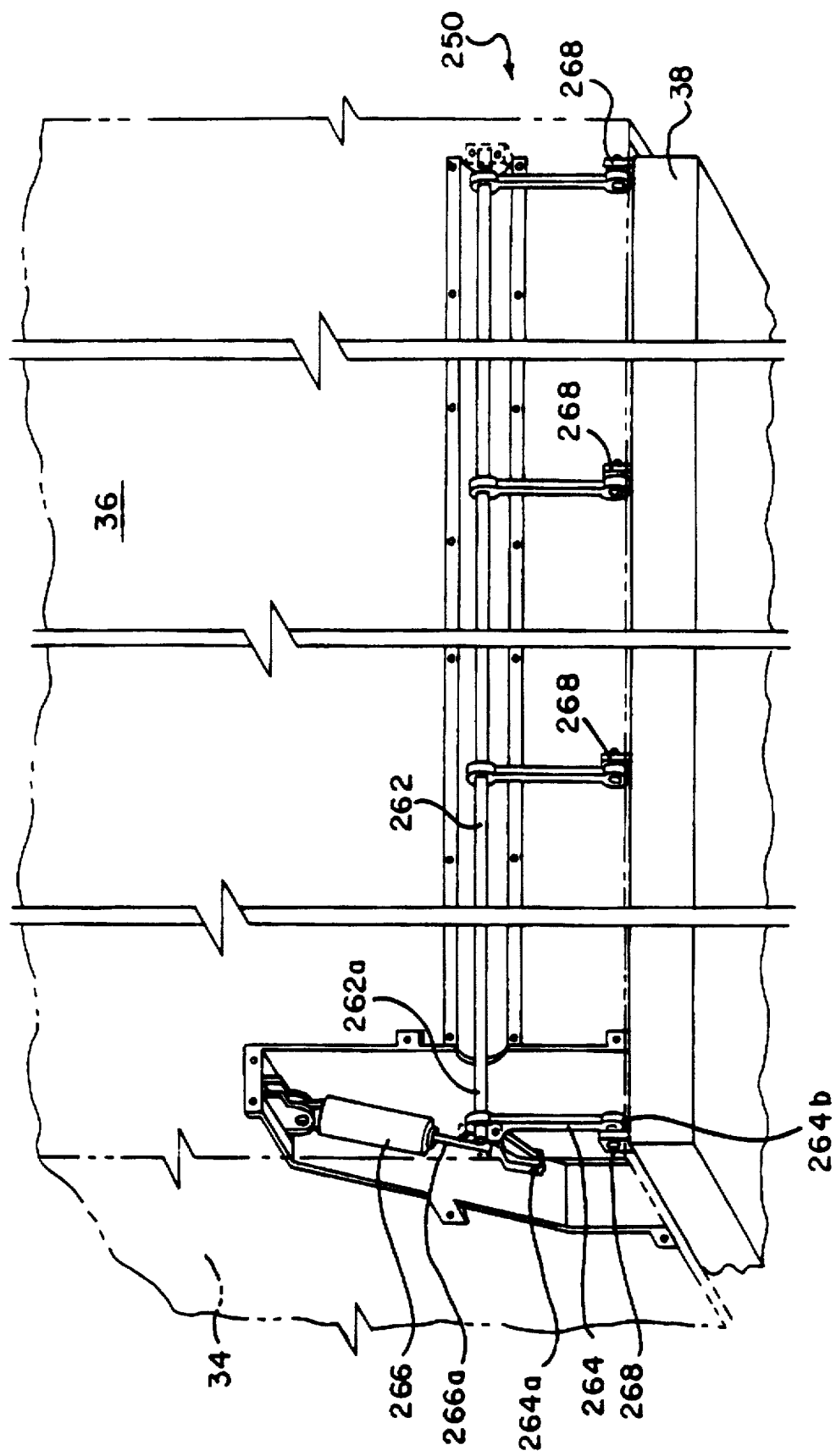
FIG. 21 is a perspective view of a fourth embodiment of the floor leveler assembly in the lowered position.
Figure 22:
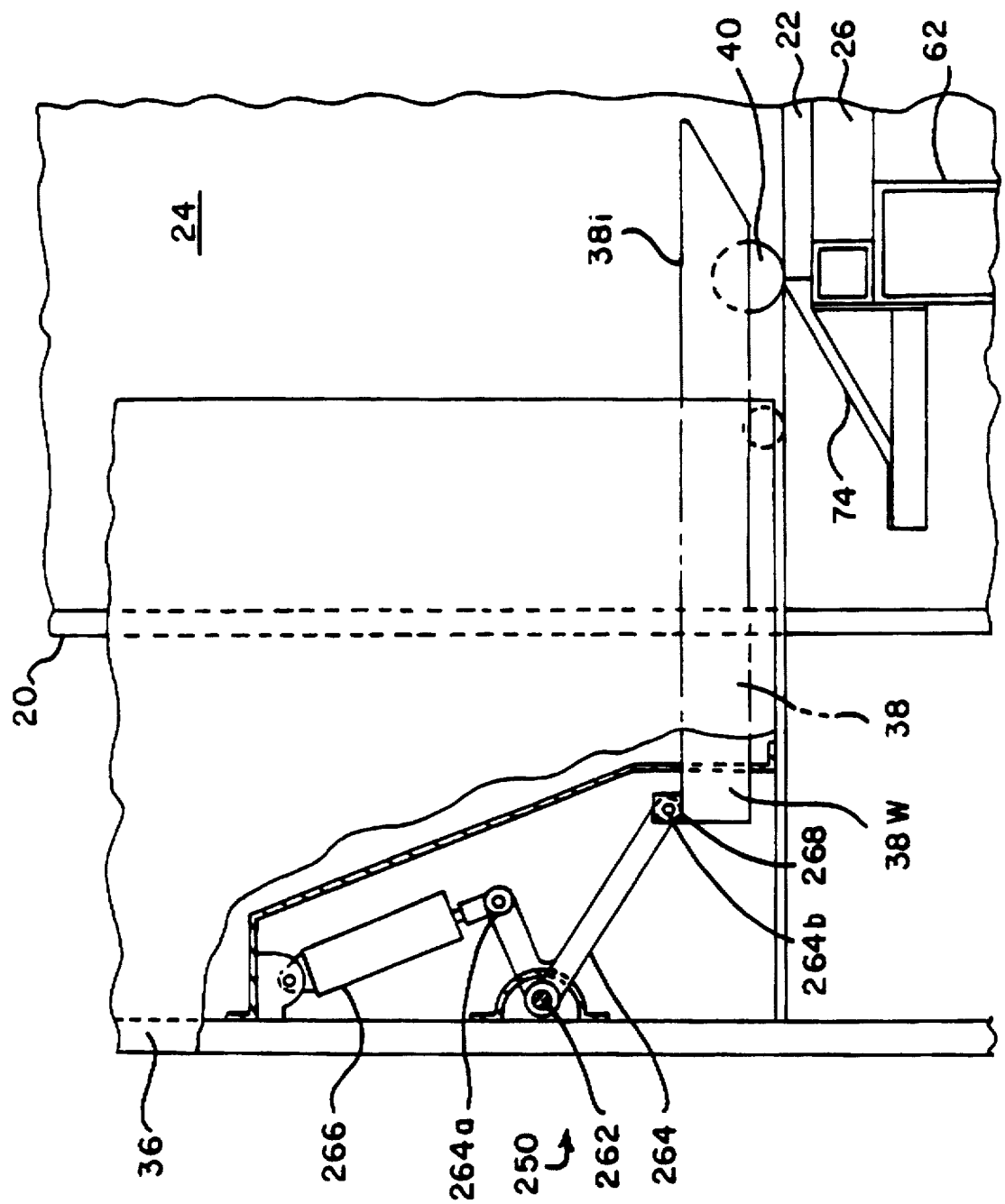
FIG. 22 is an elevational view of the fourth embodiment of the floor leveler assembly in the retracted position.
Figure 23:
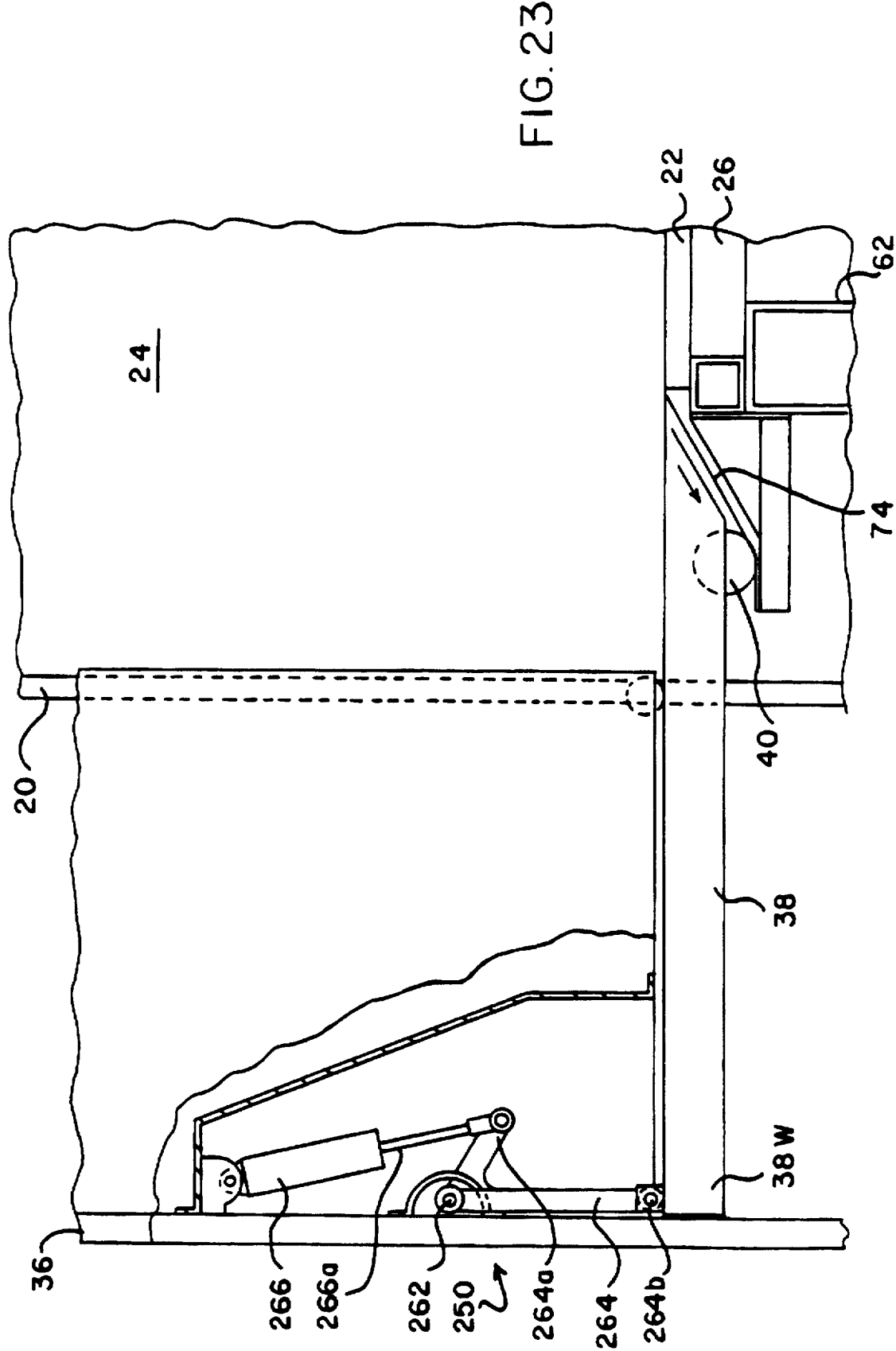
FIG. 23 is an elevational view of the fourth embodiment of the floor leveler assembly in the extended position.

FIGS. 21–23 illustrate a fourth embodiment of the slideout mechanism 250, comprising a leveler assembly 260. The leveler assembly 260 comprises a pivot bar 262 pivotably mounted in the side wall 36 of the cabin section 12 and extending between the front and rear walls 32, 34 of the cabin section 12. A generally L-shaped linkage 264 is attached to the rear end 262a of the pivot bar 262. One end 264a of the linkage 264 is pivotably attached to an actuation cylinder 266 and the second end 264b is pivotably attached to a support bracket 268 mounted to the wall end 38w of the cabin floor 38.

The actuation cylinder 266 is pivotably mounted at the side wall 36 so that the piston rod 266a may be moved between a retracted position as shown in FIG. 22 and an extended position as shown in FIGS. 21 and 23. In the retracted position, the piston rod 266a supports the wall end 38w of the cabin floor 38 above the trailer floor 22. Conversely, in the extended position, the piston rod 266a supports the cabin floor 38 so that the cabin floor 38 is level with the trailer floor 22.

In operation, one of the embodiments of the extension assembly described above is used to move the cabin section 12 in the horizontal direction, from the retracted position toward the extended position shown in FIG. 22. The piston rod 266a is in the retracted position and the wall end 38w and interior ends 38i of the cabin floor 38 are level with each other as generally shown in FIG. 22. When the floor rollers 40 reach the trailer ramp section 74, the horizontal movement of the cabin walls 32, 34, 36 is terminated and the leveler assembly 250 is actuated. The actuation cylinder 266 is activated to pivot the wall end 38w of the cabin floor downwardly, thereby pulling the interior end 38i of the cabin floor 38 and the floor rollers 40 down the ramp section 74. Specifically, the linkage 264 is rotated in the clockwise direction in response to the extension of the piston rod 266a which causes the wall end 38w of the cabin floor to be lowered into level engagement with the trailer floor 22. It will be appreciated that the cabin floor 38 moves independently of the cabin walls 32, 34, 36.

Thus, it will be seen that a novel and improved trailer slideout mechanism has been provided which attains the aforenoted objects. Various additional modifications of the embodiments specifically illustrated and described herein will be apparent to those skilled in the art, particularly in light of the teachings of this invention.

We claim as our invention:

1. A slideout mechanism for use in a trailer having a floor, a wall, an opening in the wall, and an extensible cabin movable through the opening between retracted and extended positions, the cabin having a floor and walls, said slideout mechanism comprising extension means for positioning the cabin between the retracted position wherein the cabin is disposed substantially inside the trailer and the extended position wherein the cabin is disposed substantially outside of the trailer, and wherein the extension means has an actuator mounted to the trailer and the cabin so that extension of the actuator positions the cabin towards the extended position and contraction of the actuator positions the cabin towards the retracted position, and one end of the actuator slidably engages a slot in the cabin so that the actuator end moves vertically relative to the cabin as the cabin is positioned between the raised and lowered positions, and leveling means for vertically positioning the cabin floor between a raised position wherein the cabin floor is substantially above the trailer floor and a lowered position wherein the cabin floor is substantially level with the trailer floor.

2. The mechanism as set forth in claim 1 wherein the leveling means has a frame member for supporting the cabin as the cabin is positioned between the retracted and extended positions.

3. The mechanism as set forth in claim 2 wherein one end of the frame member telescopingly engages the trailer and a second end of the frame member is rigidly attached to the cabin for supporting the cabin as the cabin and the frame member are positioned between the retracted and extended positions.

4. The mechanism as set forth in claim 1 wherein the leveling means comprises a frame member having a predetermined profile adapted to control the vertical movement of the cabin floor relative to the trailer floor as the cabin is positioned between the retracted and extended positions.

5. The mechanism as set forth in claim 4 wherein the frame member comprises an inclined section for vertically positioning the cabin floor relative to the trailer floor as the cabin is positioned between the retracted and extended positions.

6. The mechanism as set forth in claim 4 wherein the frame member comprises an inclined section for vertically positioning an outboard end of the cabin floor between the raised and lowered positions as the cabin is positioned between the retracted and extended positions.

7. The mechanism as set forth in claim 6 wherein the leveling means comprises a ramp member for vertically positioning an inboard end of the cabin floor between the raised and lowered positions as the cabin is positioned between the retracted and extended positions.

8. A trailer comprising a floor, a wall, an opening in the wall, and an extensible cabin movable through the opening between retracted and extended positions, the cabin having a floor and walls, and a slideout mechanism having extension means for positioning the cabin between the retracted position wherein the cabin is disposed substantially inside the trailer and the extended position wherein the cabin is disposed substantially outside of the trailer, and wherein the extension means has an actuator mounted to the trailer and the cabin so that extension of the actuator positions the cabin towards the extended position and contraction of the actuator positions the cabin towards the retracted position, and one end of the actuator slidably engages a slot in the cabin so that the actuator end moves vertically relative to the cabin as the cabin is positioned between the raised and lowered positions, and leveling means for vertically positioning the cabin floor between a raised position wherein the cabin floor is substantially above the trailer floor and a lowered position wherein the cabin floor is substantially level with the trailer floor, and means for sealing the gaps between the periphery of the cabin and the trailer to prevent infiltration of air through the gap.

9. A trailer as set forth in claim 8 wherein the cabin has inboard and outboard flanges which engage the periphery of the opening when the cabin is positioned at the extended and retracted positions, respectively and the sealing means comprises at least one seal member disposed on one of the opening periphery and the flanges for forming a seal with the other of the opening periphery and the flanges when the flanges and opening periphery engage each other.

10. A trailer as set forth in claim 8 wherein the sealing means comprises a seal disposed on one of the cabin floor and the trailer floor so that the seal engages the other of the cabin floor and the trailer floor when the cabin floor is in the retracted position thereby forming a seal about the periphery of the cabin and trailer floors.

11. A trailer as set forth in claim 8 wherein the sealing means comprises a seal disposed on one of the cabin floor and the trailer floor so that the seal engages the other of the cabin floor and the trailer floor when the cabin floor is in the extended position thereby forming a seal about the periphery of the cabin and trailer floors.

12. A trailer comprising a floor, a wall, an opening in the wall, and an extensible cabin movable through the opening between retracted and extended positions in response to a slideout mechanism, the cabin having walls and a cabin floor adapted for vertical movement relative to the cabin walls, the slideout mechanism comprising extension means for positioning the cabin between the retracted position wherein the cabin is disposed substantially inside the trailer and the extended position wherein the cabin is disposed substantially outside of the trailer, and leveling means for vertically positioning the cabin floor between a raised position wherein the cabin floor is above the trailer floor and a lowered position wherein the cabin floor is substantially level with the trailer floor wherein the leveling means comprises a leveler assembly having at least one cam assembly for vertically positioning the outboard end of the cabin between the raised and lowered position.

13. The trailer as set forth in claim 12 wherein the leveling means comprises a ramp member for vertically positioning an inboard end of the cabin floor between the raised and lowered positions in response to movement of the cabin between the retracted and extended positions.

14. The trailer as set forth in claim 12 wherein the cam assembly comprises a cam member supporting the cabin floor and rotatably mounted for movement between a raised position wherein the cabin floor is positioned substantially above the trailer floor and a lowered position wherein the cabin floor is positioned substantially level with the trailer floor.

15. The trailer as set forth in claim 14 wherein the cam assembly comprises an actuator for rotating the cam member between the raised and lowered positions.

16. The trailer as set forth in claim 14 wherein the cam member has a first end supporting the cabin floor and a second end connected to an actuator adapted to rotate the cam member in response to the position of the cabin between the retracted and extended positions.

17. The trailer as set forth in claim 12 wherein the leveling means comprises a ramp member for vertically positioning the inboard end of the cabin floor between the raised and lowered positions in response to movement of the cabin between the retracted and extended positions, and the cam assembly is synchronized to vertically position the outboard end of the cabin floor in unison with the inboard end of the cabin for maintaining a level orientation of the cabin floor between the raised and lowered positions.

18. The trailer as set forth in claim 12 wherein the leveling means comprises ramp member for vertically positioning the inboard end of the cabin floor between the raised and lowered positions in response to movement of the cabin between the retracted and extended positions, and the cam assembly is synchronized to vertically position the outboard end of the cabin floor in unison with the inboard end of the cabin for maintaining a level orientation of the cabin floor between the raised and lowered positions.

* * * * *